US012572610B2

(12) United States Patent (10) Patent No.: US 12,572,610 B2
Sloan (45) Date of Patent: Mar. 10, 2026

(54) INCENTIVIZED ELECTRONIC PLATFORM

(71) Applicant: Fan Label, LLC, Birmingham, MI (US)

(72) Inventor: Jeffrey M. Sloan, Birmingham, MI (US)

(73) Assignee: Fan Label, LLC, Birmingham, MI (US)

( * ) Notice: Subject to any disclaimer, the term of this patent is extended or adjusted under 35 U.S.C. 154(b) by 0 days.

(21) Appl. No.: 18/934,811

(22) Filed: Nov. 1, 2024

(65) Prior Publication Data

US 2025/0061159 A1 Feb. 20, 2025

Related U.S. Application Data

(63) Continuation-in-part of application No. 18/318,441, filed on May 16, 2023, now Pat. No. 12,193,580, which is a continuation-in-part of application No. 17/866,126, filed on Jul. 15, 2022, now Pat. No. 11,704,377, which is a continuation-in-part of application No. 17/228,060, filed on Apr. 12, 2021, now Pat. No. 11,392,656, which is a continuation of application No. 15/637,844, filed on Jun. 29, 2017, now Pat. No. 11,023,543.

(51) Int. Cl.
G06F 16/9535 (2019.01)
G06F 16/61 (2019.01)
G06F 16/638 (2019.01)
G06F 16/9536 (2019.01)
G06F 16/9537 (2019.01)

(52) U.S. Cl.
CPC .......... G06F 16/9535 (2019.01); G06F 16/61 (2019.01); G06F 16/638 (2019.01); G06F 16/9536 (2019.01); G06F 16/9537 (2019.01)

(58) Field of Classification Search
CPC ........ G06F 16/21; G06F 16/23; G06F 16/282; G06F 16/90; G06F 16/903; G06F 16/9035; G06F 16/906
See application file for complete search history.

(56) References Cited

U.S. PATENT DOCUMENTS

| | | | |
|---|---|---|---|
| 7,921,440 B1 | 4/2011 | Kolde et al. | |
| 8,095,424 B2 | 1/2012 | Eglen et al. | |
| 8,353,750 B2 | 1/2013 | Patchen | |
| 8,380,710 B1 | 2/2013 | Finne et al. | |
| 8,678,930 B2 | 3/2014 | Gabrail et al. | |
| 8,756,224 B2 | 6/2014 | Dassa et al. | |

(Continued)

OTHER PUBLICATIONS

Larimer, Daniel et al., Steem, an Incentivized, Blockchain-based Social Media Platform, 2012, 44 pages.

(Continued)

*Primary Examiner* — Angelica Ruiz
(74) *Attorney, Agent, or Firm* — Brooks Kushman P.C.

(57) ABSTRACT
A data structure embodied on a computer-readable medium is disclosed. The data structure may include database schema such as a structured query language (SQL) database. The database schema may include a registration schema that cooperates with a competition schema to award contestants engaged in a game of skill. The competition schema may encourage contestants to participate in games of skill related to songs, artists, and/or albums.

21 Claims, 32 Drawing Sheets

(56) References Cited

U.S. PATENT DOCUMENTS

| | | | |
|---|---|---|---|
| 9,162,107 | B2 | 10/2015 | Aminzade |
| 9,669,299 | B2 | 6/2017 | Originale Di Criscio et al. |
| 11,459,245 | B2 | 10/2022 | Kleinguetl et al. |
| 11,551,529 | B2 | 1/2023 | Lockton |
| 11,557,179 | B2 | 1/2023 | Givant |
| 2006/0008256 | A1 | 1/2006 | Khedouri et al. |
| 2006/0224451 | A1 | 10/2006 | Kerschbrock et al. |
| 2007/0191102 | A1 | 8/2007 | Coliz et al. |
| 2008/0032723 | A1 | 2/2008 | Rosenberg |
| 2008/0215420 | A1 | 9/2008 | Angelica |
| 2008/0297586 | A1* | 12/2008 | Kurtz .................. H04L 12/1827 |
| | | | 348/E7.083 |
| 2009/0063511 | A1 | 3/2009 | Myers et al. |
| 2009/0070331 | A1 | 3/2009 | Silman |
| 2009/0277322 | A1 | 11/2009 | Cai et al. |
| 2009/0288118 | A1 | 11/2009 | Chang |
| 2010/0169204 | A1 | 7/2010 | Sippy et al. |
| 2011/0055223 | A1 | 3/2011 | Elmore et al. |
| 2011/0225121 | A1 | 9/2011 | Cooper et al. |
| 2012/0011129 | A1 | 1/2012 | van Zwol et al. |
| 2013/0073400 | A1 | 3/2013 | Heath |
| 2013/0073473 | A1 | 3/2013 | Heath |
| 2013/0116032 | A1* | 5/2013 | Lutnick ............... G07F 17/3279 |
| | | | 463/25 |
| 2013/0117063 | A1 | 5/2013 | Kamath et al. |
| 2013/0191399 | A1* | 7/2013 | Tocaben ................ G06F 16/435 |
| | | | 707/748 |
| 2013/0218862 | A1 | 8/2013 | Ghosh et al. |
| 2014/0136554 | A1 | 5/2014 | Moradi et al. |
| 2014/0162741 | A1 | 6/2014 | Diskin et al. |
| 2014/0179442 | A1 | 6/2014 | Quinlivan et al. |
| 2014/0278986 | A1 | 9/2014 | Rouse et al. |
| 2014/0344294 | A1 | 11/2014 | Skeen et al. |
| 2015/0045111 | A1 | 2/2015 | Nelson et al. |
| 2015/0120767 | A1 | 4/2015 | Skeen et al. |
| 2016/0117063 | A1 | 4/2016 | Fuller |
| 2016/0149956 | A1 | 5/2016 | Birnbaum et al. |
| 2016/0228640 | A1* | 8/2016 | Pindado ............. A61N 1/37282 |
| 2016/0328926 | A1* | 11/2016 | Boese ................. G07F 17/3213 |
| 2016/0343211 | A1* | 11/2016 | Graboyes Goldman .................... |
| | | | G07F 17/3225 |
| 2018/0018712 | A1 | 1/2018 | Walden et al. |
| 2020/0065853 | A1* | 2/2020 | Cvinar .............. G06Q 30/0276 |
| 2020/0068006 | A1* | 2/2020 | Villa Real ............... H04L 67/06 |
| 2021/0074068 | A1* | 3/2021 | Spivack ................. G06N 20/00 |
| 2023/0057073 | A1* | 2/2023 | Walker ................. G06T 19/006 |

OTHER PUBLICATIONS

Pfeiffer, Joseph, III et al., Incentivized Sharing in Social Networks, VLDB Workshop on Online Social Systems (WOSS), 2012, 6 pages.

McNew, Sarah, Incentivize Your Fans: a New Approach to Social Media Fans, http://my.social toaster.com, Jun. 11, 2014, 3 pages.

https://fandistro.com/releasing/, A FanDistro Campaign Will Get Your Video Shared More, Apr. 5, 2017, 4 pages.

www/http://My.SocialToaster.com, How It Works, Learn How to Turn Your Fans into Superfans, 2017, 3 pages.

Hu, Cherie; So you want to be a music mogul: The future of fantasy record labels; https://trapital.co/so-you-want-to-be-a-music-mogul-the-future-of-fantasy-record-labels/; Jan. 16, 2020; 10 pages.

Burgi, Constantin, Wanying Deng, and Karl Whelan. "Makers and Takers: The Economics of the Kalshi Prediction Market." (2025), 48 pages.

Keen, Harrison, Christopher Byrnes. "Prediction Market Derivatives Arbitrage, Economic Utility, and Pricing." (Dec. 24, 2025) 14 pages.

* cited by examiner

400

LOGO  SIGN IN AS  DASHBOARD  MY CAMPAIGNS          HOME  NEW CONTEST  HOW TO PLAY  FAN LABEL CHARTS  NEWS

Artist Dashboard (14) ▾                           CONTEST IN PROGRESS (view details) ›

| 654,546 | 22,204 | 1,885 | 2,458 | $67,386.12 |
|---------|--------|-------|-------|-----------|
| Plays | Shares | Picks | Purchases | Revenue |

Track Performance (by Most Played) ▾          Marketplace (Active) ▾

Song Artist  404      406
406
Artist Art
402

Song Artist  404      406
406
Artist Art
402

Song Artist  404      406
406
Artist Art
402

Song Artist  404      406
406
Artist Art
402

VIP Access!     Artist Art
$Cost
Offer Name
164557          23403          3640
Impressions     Voters         Purchases VIP Access!     Artist Art
$Cost
Offer Name
164557          23403          3640
Impressions     Voters         Purchases VIP Access!     Artist Art
$Cost
Offer Name

FIG. 14

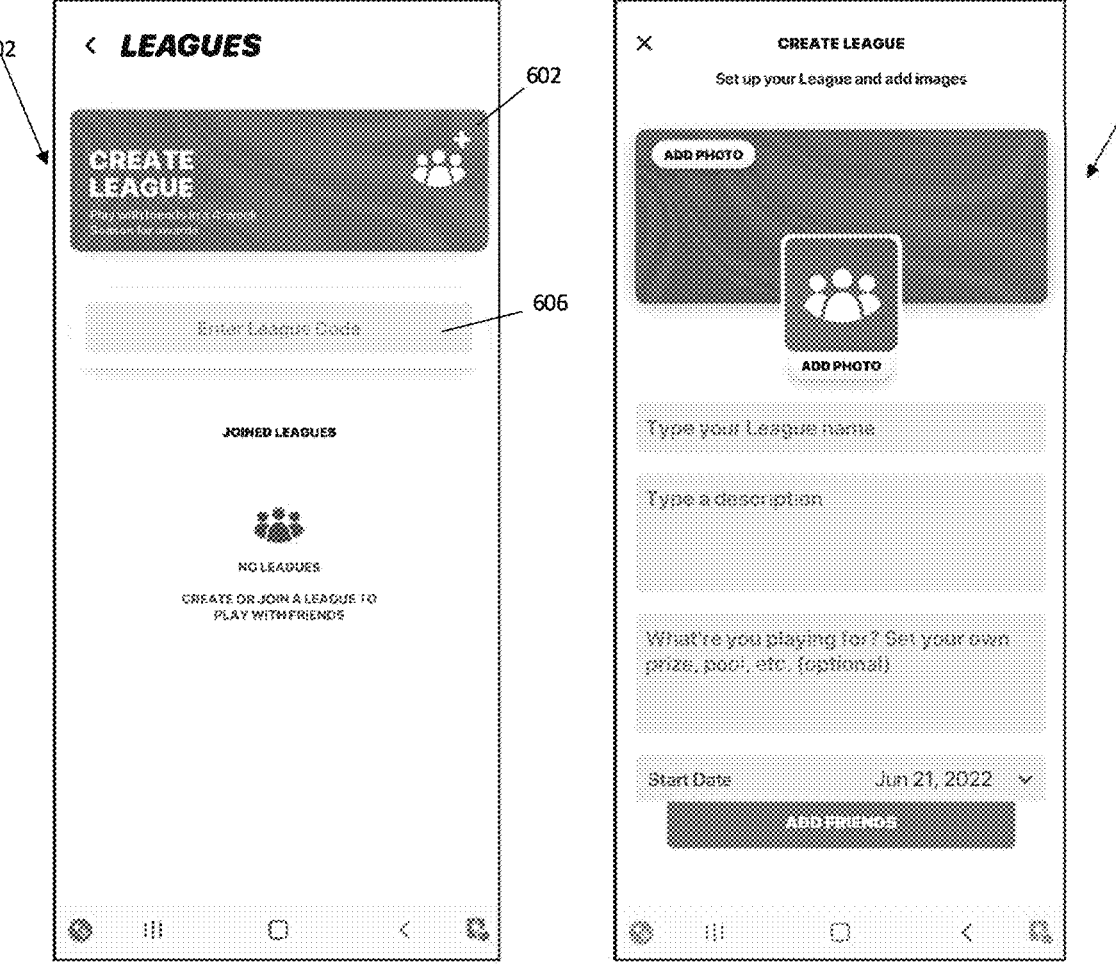
FIG. 16                 FIG. 17

102

102

FIG. 22                    FIG. 23

102
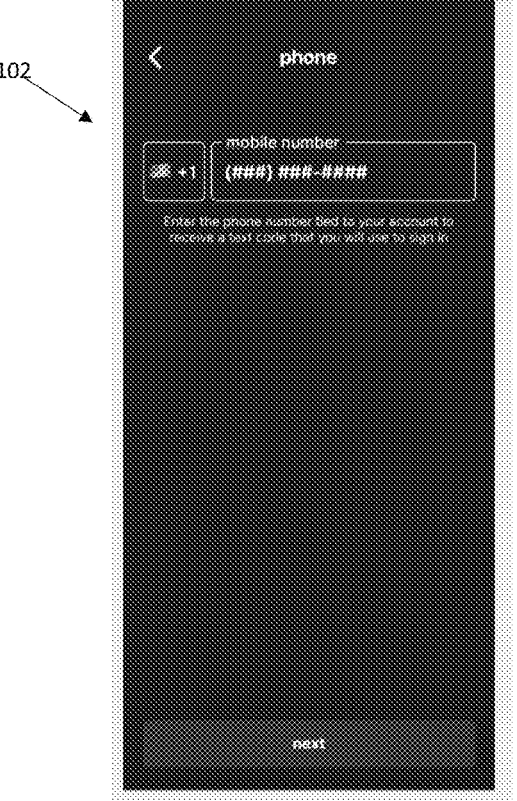
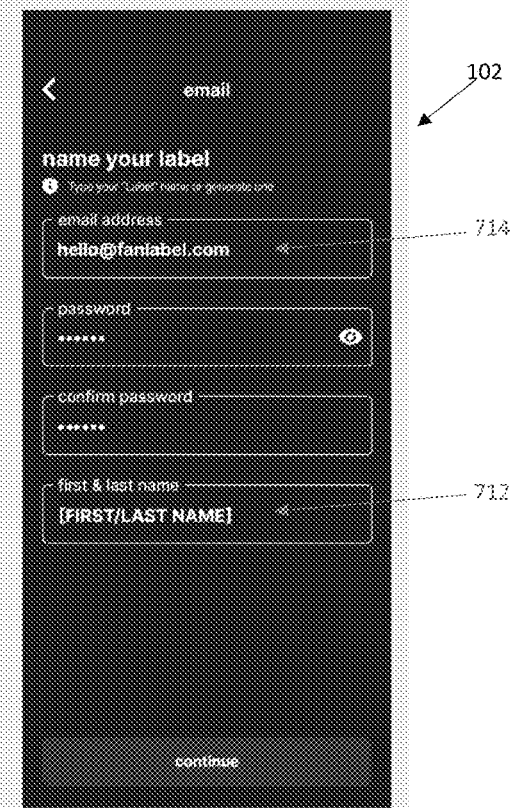
102
714
712
FIG. 24                    FIG. 25

102
102
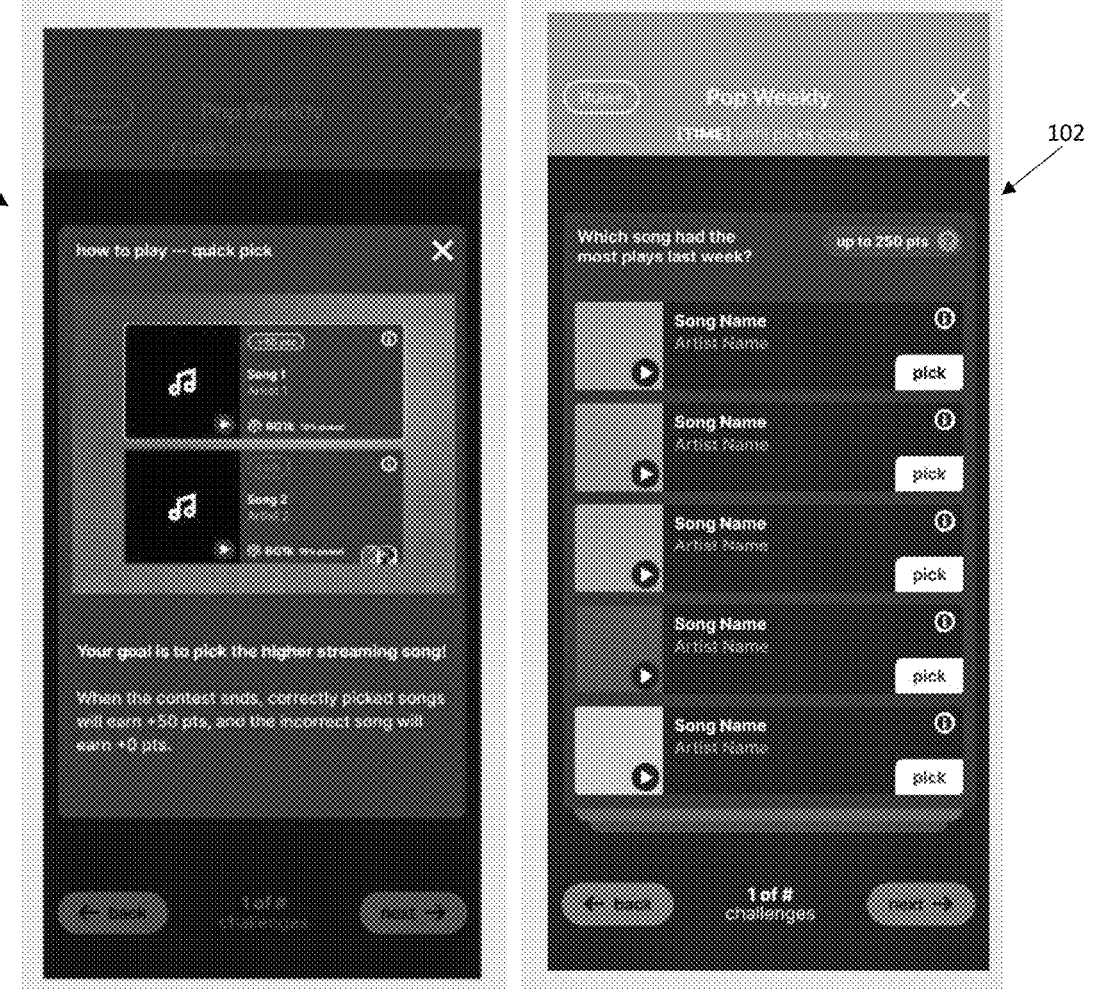
FIG. 40                  FIG. 41

102

102

102

102

102

102

102

102

INCENTIVIZED ELECTRONIC PLATFORM

CROSS-REFERENCE TO RELATED APPLICATION

This application is a continuation-in-part of U.S. application Ser. No. 18/318,441, filed May 16, 2023 and issued on Jan. 14, 2025 as U.S. Pat. No. 12,193,580, which is a continuation-in-part of U.S. application Ser. No. 17/866, 126, filed Jul. 15, 2022 and issued on Jul. 18, 2023 as U.S. Pat. No. 11,704,377, which is a continuation-in-part of U.S. application Ser. No. 17/228,060 filed Apr. 12, 2021 and issued on Jul. 19, 2022 as U.S. Pat. No. 11,392,656, which is a continuation of U.S. application Ser. No. 15/637,844 filed Jun. 29, 2017 and issued on Jun. 1, 2021 as U.S. Pat. No. 11,023,543, the disclosures of which is incorporated herein by reference in its entirety.

TECHNICAL FIELD

This disclosure relates to an incentivized electronic platform.

BACKGROUND

Games may be used to improve socialization and activity among groups or associations. As groups and association sizes grow, technical solutions may be used to orchestrate gameplay and tally scores. Large-scale games may cause technical failures in game regulation infrastructure or impose large overhead costs. Technical improvements to game regulation and point systems may reduce such costs and processing requirements. Additionally, the use of these games on mobile devices may further restrict the processing power available to facilitate the games.

SUMMARY

A data structure embodied on a non-transitory computer-readable medium having a database schema for administering a competition in a structured query language (SQL) database is disclosed. In one or more embodiments, the database schema comprises a registration schema, a contest schema, a digital user ranking schema, and/or an incentivized results schema. In various embodiments, the registration schema receives information from one or more users, assign user information to the user, and/or creates a user profile. In a refinement, the information received from the one or more users includes payment information. In various embodiments, the contest schema includes one or more competitions of skill. In one or more embodiments, the one or more users can each select a competition of skill for entry such as upon paying a payment. In a variation, each competition of skill includes one or more contest. In a refinement, each contest includes a plurality of digital content items for selection by the one or more users. In various embodiments, the scoring schema includes an activity tracking algorithm and/or relational data tables to track activity tracking parameters associated with user selections to generate a score for each user. In one or more embodiments, the incentivized results schema displays one or more leaders based on an associated score of the user.

An incentivized electronic platform comprising a processor including a computer having a central processing unit (CPU) for executing machine instructions and a memory for storing the machine instructions is disclosed. In various embodiments, the machine instructions operate to register a plurality of users, authenticate the plurality of users, display a competition of skill to the plurality of users, receive a selection of the competition of skill from each user, receive authorization of a payment responsive to selection of the competition of skill, display a plurality of digital content items to each user, receive one or more selections of the digital content items for the competition of skill including one or more contests, generate a score for each user based on the digital content items selected by each user, rank each user based on the score, and award a leader. In a variation, registration of the user includes creating a user profile (e.g., virtual record label) for each user, assigning authenticating information to each user, receiving payment information from the user, and/or receiving financial information to distribute funds to a user. In various embodiments, displaying the competition of skill is responsive to authenticating the user(s). In a refinement, the competition of skill is displayed to each user after authenticating the user. In some embodiments, the authenticating information assigned to the user is used to authenticate the user. In one or more embodiments, the competition of skill includes one or more contests (e.g., a plurality of contests). In a refinement, each contest includes a plurality of digital content items for selection by a user. In a variation, payment authorization is requested and received upon receiving selection of the competition of skill by a user. In various embodiments, the plurality of digital content items is displayed responsive to receiving the selection of the competition of skill and/or receiving authorization of a payment by the user. In a variation, the score is determined with an activity tracking algorithm based on one or more activity tracking parameters associated with one or more digital content items selected. In one or more embodiments, a leader is determined upon ranking the user based on their associated score.

A method of administering an incentivized electronic platform comprising registering a plurality of users, authenticating a group of users, displaying a registry of competitions to the group of users, receiving a selection of a competition from the registry from each user of the group, receiving payment authorization from each user of the group, displaying a plurality of digital content items to the user of the group, receiving a selection of a user ranking of the digital content items from each user in the group, scoring each user, and/or awarding a leader of the group. In a variation, registering the plurality of users includes obtaining user information and assigning authenticating information to each user. In one or more embodiments, each user of the group of users selects the competition from the registry and authorizes payment to participate in the competition. In a refinement, the competition includes a plurality of contests. In a variation, the plurality of digital content items displayed corresponds to at least one of the contests. In various embodiments, each user is scored with an activity tracking algorithm based on one or more activity tracking parameters associated with the digital content items. In various embodiments, the scores of each user in the group are used to determine one or more leaders of the group. In a variation, the award is representative of a monetary amount.

In various embodiments, the award schema awards one or more leaders with an award. In numerous embodiments, the digital content items are representative of a song, artist, and/or album. In a refinement, each digital content item is a song. In one or more embodiments, the plurality of contest includes a ranking contest. In a variation, the ranking contest includes ranking at least three digital content items. In various embodiments, the plurality of contests includes a non-ranking contest. In one or more embodiments, the competition of skill is displayed among a plurality of competitions of skill. In a variation, the plurality of competitions of skill are drawn to different subjects. In a refinement, the different subjects are different musical genres. In one or more embodiments, the award is representative of a monetary award. In various embodiments, the award is exchangeable for monetary compensation. In some embodiments, the one or more activity tracking parameters includes a stream count such as on the platform or on one or more streaming services (e.g., Spotify® or Apple Music®). In variation, the one or more activity tracking parameters includes a chart position. In various embodiments, the functions or methods may further comprise distributing monetary compensation to one or more leaders in exchange for the award. In some embodiments, the ranking contest includes at least five digital content items. In various embodiments, the digital content items are directed to a genre of music.

BRIEF DESCRIPTION OF THE DRAWINGS

FIG. 14 is a display screen of a GUI including a digital content item creator marketplace.

FIG. 16 is a display screen of a GUI including a prompt to initiate a competition between associated contestants.

FIG. 17 is a display screen of a GUI for receiving competition information inputs.

FIG. 22 is a display screen of an embodiment of a GUI splash screen.

FIG. 23 is a display screen of an embodiment of a GUI of a login page.

FIG. 24 is a display screen of an embodiment of a GUI of a verification screen.

FIGS. 25 and 26 are display screens of an embodiment of a GUI for creating a user profile and/or a virtual record label.

FIGS. 30-32 are respectively display screens of an embodiment of a GUI showing the prizes, rules, and contests for an embodiment of a competition.

FIG. 33-35 are display screens of an embodiment of a GUI for a ranking contest.

FIG. 40 is a pop-up display screen of an embodiment of a GUI showing the rules for the quick pick contest of FIGS. 37-39.

FIG. 41-43 are display screens of an embodiment of a GUI for a best-of-five contest.

DETAILED DESCRIPTION

Figure 1:
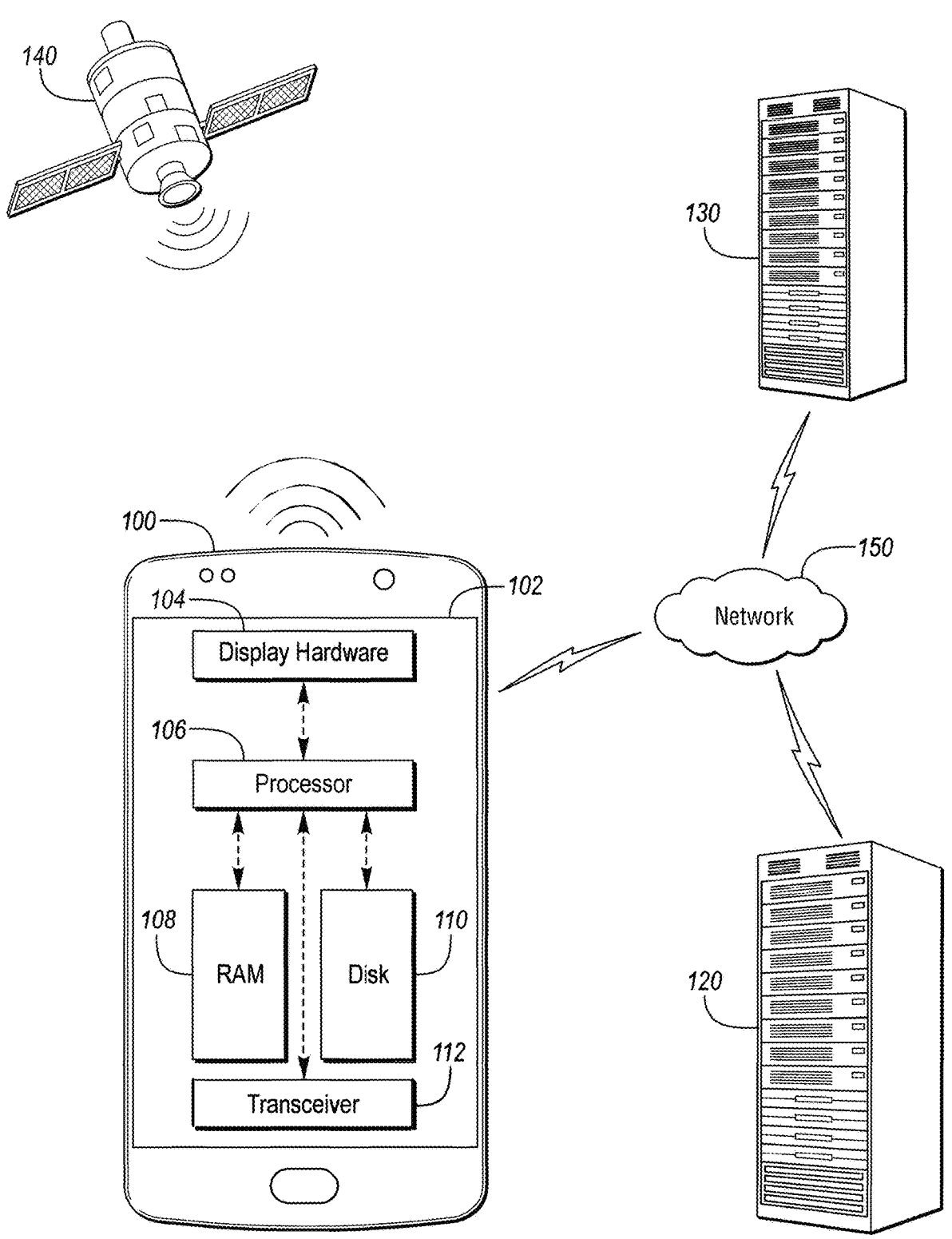
FIG. 1 is a computer system for improving the organization and point retention for an electronic game.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Processing and memory constraints necessitate efficient gaming platforms, architectures, and data schemas to allow interoperability with mobile devices. The existing computer game systems and point accumulators do not provide adequate technical solutions that provide efficient gaming platforms, architectures and data schemas. Mobile devices may have limited processing capabilities, memory availability, and data transmission capabilities. Movement from high-performance gaming rigs to mobile devices has increased the gravity of deficient data structures and communication methods.

The following proposed gaming systems have failed to provide adequate technical solutions to these acute problems.

U.S. Pat. No. 8,678,930, to Gabrail, discloses a fantasy league management system including one or more reality factors, equity lines, luxury taxes, or revenue sharing policies. The fantasy league management system discloses generic databases for storing and maintaining data. Gabrail, however, does not attempt to technically improve the association of data within the system or improve data structures and components necessary for fantasy league management. Gabrail attempts to apply computer methods to a well-known fantasy league practice, instead of a technical improvement to computers processing fantasy league parameters.

U.S. Pub. No. 2013/0191399A1, to Tacoben, discloses an inadequate content distribution system. The Tacoben system and method provides a generic "rotational database" structure. The Tacoben system does not provide technical improvement data structures to reduce processing, transmission, and memory usage of mobile devices and backend servers. Tacoben does not provide an improvement to computer functionality itself such as improving data structures required to maintain and process digital content.

U.S. Pub. No 2014/0162741A1, to Diskin, discloses a non-technical improvement to a fantasy league system for allocating points to a fantasy team. Diskin fails to address technical aspects necessary to improve the digital computer system. The fantasy league system of Diskin does not address specific data structures necessary to meet mobile device constraints.

On the other hand, the incentivized electronic platform, the computer system, the computer-readable medium, and the database signature components and parts described herein provide a non-abstract, technological improvement over the previous methods. These technological improvements are rooted in an incentivized data structure having a digital user ranking schema, and an incentivized results schema. The digital user ranking schema and the incentivized results schema are used by an incentivized electronic platform approach to access and manage provided digital content items in a SQL database.

According to one embodiment, a data structure embodied on a computer-readable medium may include a database schema for accessing and managing incentivized electronic platform data. Data stored in the schema may include digital content items or referential information to the digital content items. Each of the digital content items may be identified by a unique identifier. The unique identifier may be assigned to each digital content item using a hash mechanism (e.g., MD5). The unique identifier may also include a first portion to identify an original work and a second portion to identify a derivative work. The unique identifier may be used to organize the schema.

The schema may also include ranking information. The ranking information may be used to generate digital registers, including a subset of digital content items based on popularity or association (e.g., using a private or public popularity index, chart position, and/or stream count). The schema is an innovative logical model for maintaining game data and information. An additional digital register may include a subset of unranked digital content items. The schema may include a column or identifier for recognizing unranked digital content items (e.g., null).

The ranked and unranked digital registers may be sent to a user through a network (e.g., internet) for selection such that the user can participate in a game. The user may select from the digital registers to form a digital user ranking. The digital user ranking may include digital content items from one or more registers (e.g., both a ranked and unranked digital registry). After the digital user ranking is determined, it is compared against other digital user rankings. The comparison uses activity tracking parameters (e.g., popularity index, stream count, likes, shares, etc.) to determine points (i.e., virtual credits/currency which may be e.g., representative of real currency or exchanged for real currency/monetary compensation) associated with each digital user ranking. For example, an activity tracking parameter may be the popularity of the digital content item. If the digital content item is a song, points may be assigned to the digital user ranking based on the improvement of the song along the charts.

Referring to FIG. 1, a mobile device 100 is shown. The mobile device 100 may include a display 102. The display 102 may be an LCD, OLED or another implement. The display 102 may be driven by display hardware 104, which may include processors or drivers for illuminating the display 102. The display hardware 104 may be connected to a processor or processors 106. The processors 106 are associated with memory 108 and storage 110. The mobile device 100 may also include a transceiver 112 connected to the processor 106 for sending and receiving digital register data, digital user rankings, game information, game scores, and other information required by the game. For example, the game may have a location or region component to localize players such that players compete against similarly situated contestants. The localization component may use GPS 140 or cellular towers to locate and track the mobile device 100 over time. The device 100 may be associated with other nearby devices to form competitive groups. The players may be otherwise associated. For example, the players may be associated by school, fraternity, sports teams, historical play, employment, or other user preferences/affiliations such as historical play, preferred music genre, favorite song(s), artist(s), album(s), etc.).

Figure 26:
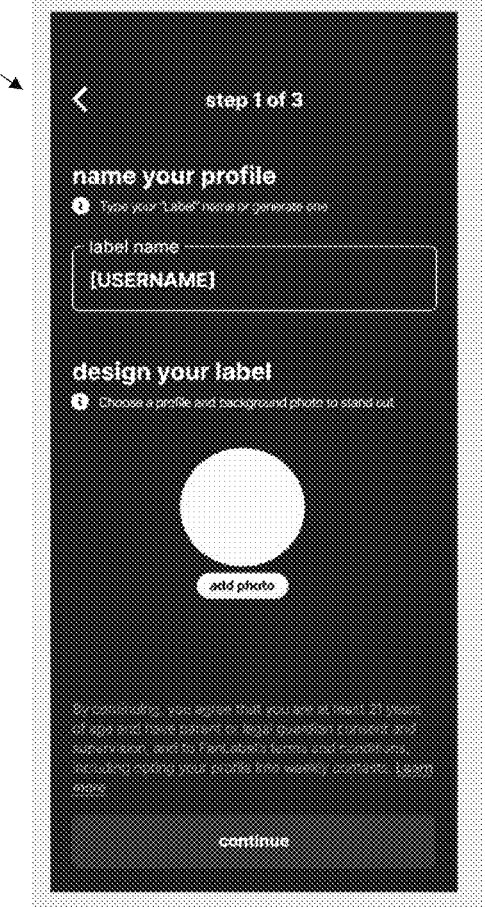
Figure 27:
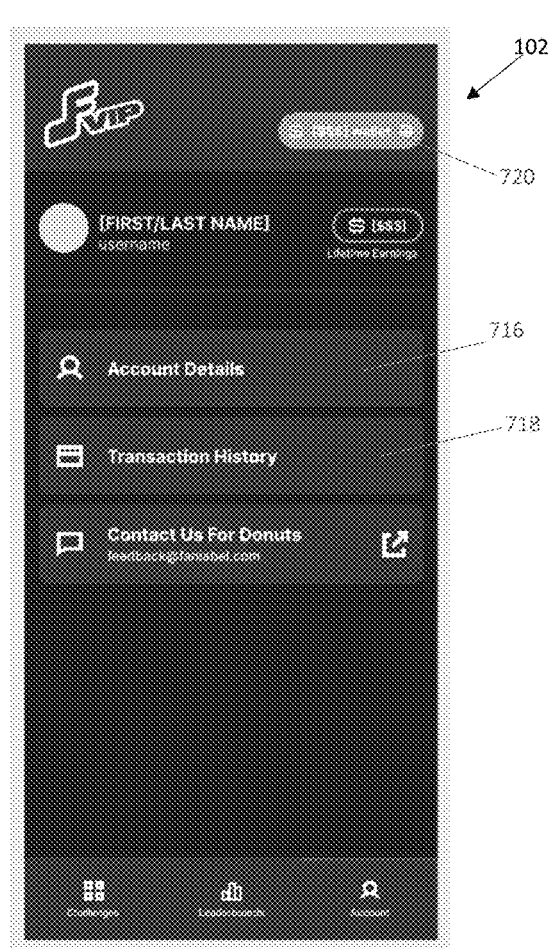
FIG. 27 is a display screen of an embodiment of a GUI of an account or profile menu for a user.

In one or more embodiments, a registration schema may be employed to register users/players/contestants. In various embodiments, a splash screen, as in FIG. 22, may be displayed to a user followed by a screen prompting a user to create a profile, as shown in FIG. 23. For example, the user may select a button 706 to register. In some embodiments, at least some gameplay may require registration. In a refinement, the same screen (or a different screen) may prompt a user to authenticate themselves such as with a username 708 and password 710 such that a user can login or alternatively create a new account to obtain authentication credentials. Other authenticating information such as biometrics and/or a pin may be used in addition to or as an alternative to a password. In various embodiments, the user may provide information such as identity/contact information (e.g., name 712, location, address, phone number, email address 714), financial information (e.g., payment information, account information, and/or other information to distribute funds), profile information (e.g., username and/or virtual record label name) or additional information (e.g., education, affiliations, and/or favorite/preferred songs, artist, albums, and/or genres), as shown in FIGS. 24-26. In some embodiments, registration may include assigning a user information such as authenticating information (e.g., a username, password, and/or pin). In a refinement, the user may input a desired authenticating information or otherwise select authenticating information (e.g., entering a preferred password or pin). In a variation, a user may set up two-factor authentication, as shown in FIG. 24, such as for paid competitions/contests.

In one or more embodiments, registration may occur in one or more steps that are not simultaneously performed (i.e., performed at different times with a period of time therebetween). For example, a user may initially register by entering their name, address, phone number and/or email address, and selecting an available username and password. However, prior to participating in competitions or a contest, a user may create or update their profile such as by providing a virtual record label name and/or providing a logo/image to represent that virtual record label, as shown in FIG. 26. In still another step at another time, such as before participating in a paid contest (i.e., "cash" game) such as shown in FIGS. 28-49, the user may update its registration by setting up two-factor authentication (as shown in FIG. 24) and providing payment information. In yet a later step, for example, a user may provide information for distributing funds to the user after winning a "cash" game and receiving a cash reward. In various embodiments, this may also be considered part of registration, regardless, of whether it occurs in a single step simultaneously, or a plurality of steps occurring at different times unless expressly indicated otherwise. In some embodiments, registration may be required before participating in a contest (e.g., a paid contest).

In one or more embodiments, a user may update or change the profile information as needed and/or as appropriate. A user's historical participation in competitions, transactions, and/or other information may be tracked and/or made available to a user such as through the user profile. For example, a user may select a first button 716 to view and/or modify the profile information and select a second button 718 to view past transactions. In various embodiments, the user profile may also include access to a wallet 720, which may include virtual credits/currency or other information indicative of money. In one or more embodiments, the virtual credits/currency is representative of real currency and/or may be exchangeable for real currency such as United States Dollars (USD). In various embodiments, such as paid competitions/contests virtual credits/currency representative of real currency or real currency may be used to participate in competition such as paid competitions/contests and/or be awarded for winners and/or leaders. In one or more embodiments, leaders may be the top contestant, top two contestants, top three contestants, or top five contestants. In a variation, the leaders may be the top 1%, 3%, 5%, 10%, or 25%. A user may increase the virtual currency such as by authorizing a payment transaction from the user to the incentivized platform.

In a variation, the players may be associated by personal relationships (e.g., the players may be friends and/or family). In one or more embodiments, the schema may include a grouping schema for forming the competitive groups. In a refinement, the grouping schema may be populated by a host contestant. The host contestant may initiate a competition between associated contestants by engaging a prompt 602 such as a (digital or virtual) button on a screen of the GUI 102 on the display of, for example, a user transceiver such as the mobile device, as shown in FIG. 16.

Figure 18:
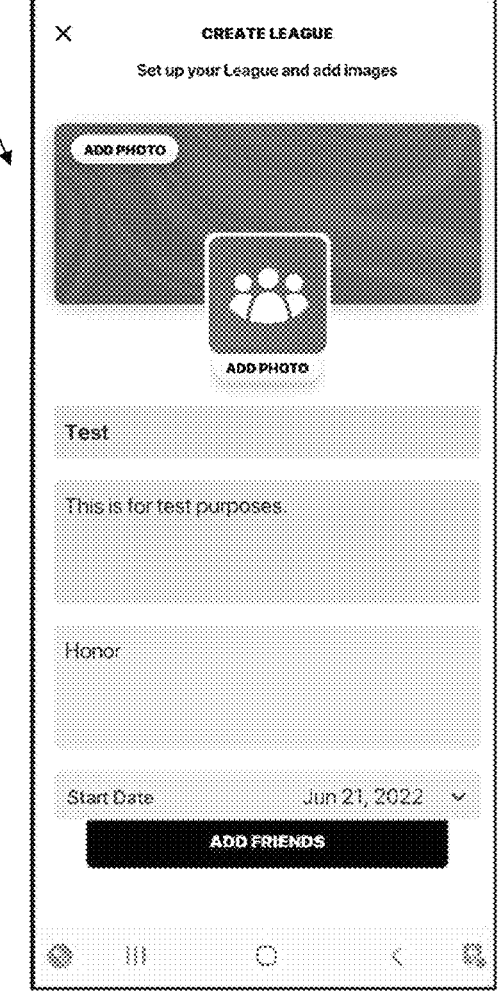
FIG. 18 is a display screen of a GUI with competition information inputs.
Figure 19:
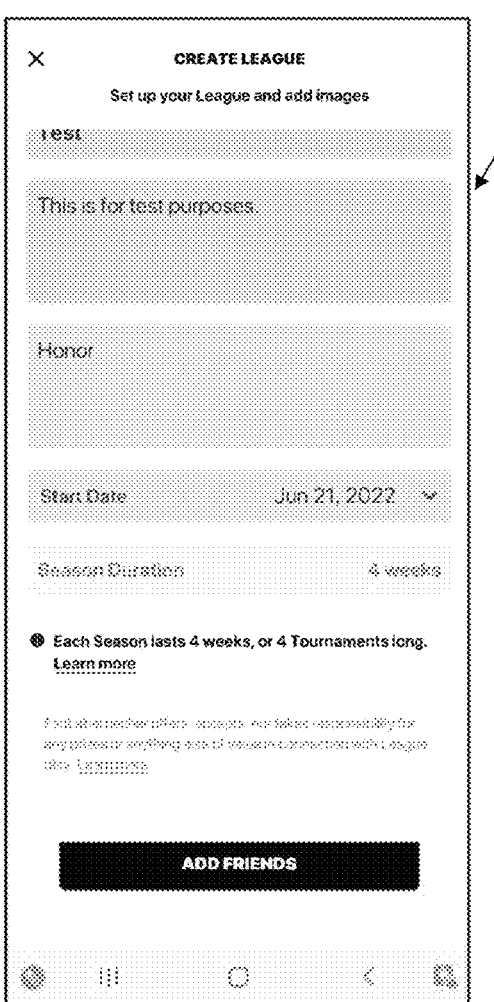
FIG. 19 is a continuation of the display screen of FIG. 18.
Figures 20, 21:
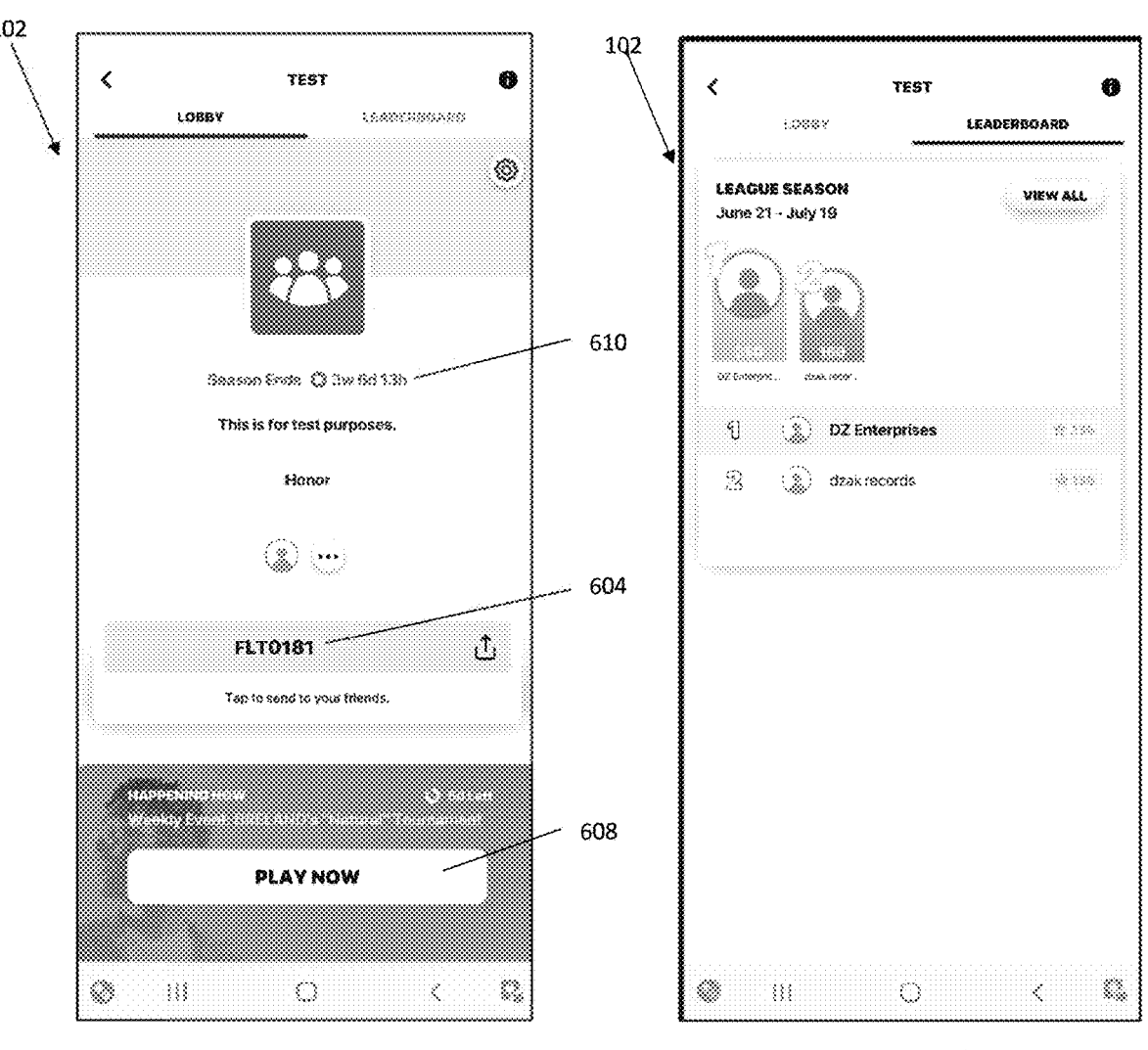
FIG. 20 is a display screen of a GUI of a lobby for a competition.
FIG. 21 is a display screen of a GUI of a leaderboard for a competition.

Upon receiving the prompt, the schema may initiate a competition, as shown in FIG. 20. The schema may transmit a screen to the host contestant for receiving competition information such as a competition image, a competition name, a competition description, a competition prize, a start date/time, and a duration (i.e., end date/time), as shown in FIGS. 17-19. The competition information may be received after engaging the prompt 602 to create a new competition. The schema may also receive contestant information for identifying the one or more contestants such as from the host contestant.

Once identified the schema may transmit a competition invitation to and/or invite the one or more contestants such that they join the competition. For example, the schema may employ an application on the user transceiver such that an invitation notification and/or invite joins the one or more users into the competition. Alternatively, or in combination, the schema may assign a unique competition code 604 for the competition. The one or more unassociated users (e.g., users that have not joined yet) may join the competition as contestants with the unique competition code 604. For example, the application may have an entry box 606 for inputting the unique competition code 604, as shown in FIG. 16.

After the private competition with the competitive group is established, the platform may coordinate the grouping schema with a contest schema. The contest schema may include and provide contestants a plurality of contests such as by transmitting the contests to the one or more user transceivers of the contestants. A contest may identify a number of competing virtual music labels that are associated with a corresponding number of user or contestants.

Figure 28:
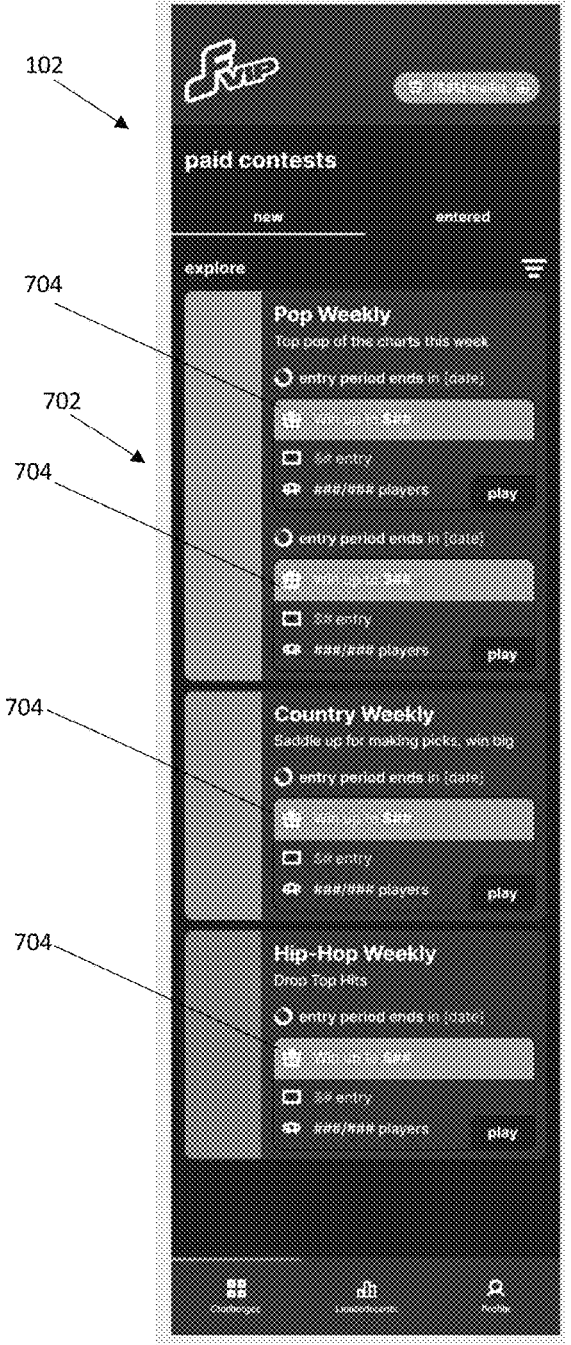
FIG. 28 is a display screen of an embodiment of a GUI showing an available contests page.

Alternatively, or additionally, one or more registries 702 of available competitions/contests 704 may be displayed to a user through the display 102, as shown in FIG. 28. In a variation, a user may be prompted to select a competition/contest for participation therein (i.e., the incentivized electronic platform receives a selection from a user for a competition/contest). In a variation, a user may need to and/or be prompted to authenticate themselves such as with authentication information issued during registration (e.g., a username, password, and/or pin) prior to selecting a competition. For example, authentication, as shown in FIG. 23, prior to entering a paid competition may be required. Authorization for a payment may also be required prior to entering a paid competition. In one or more embodiments, the registry of competitions may be displayed in groups (i.e., a plurality of groups) such as by subject matter (e.g., groups of different genres). For example, the registry may include a first group directed to a first genre (e.g., the current weeks most popular pop music), a second group directed to a second different genre (e.g., the current weeks most popular country music), and/or a third group directed to a third genre (e.g., the current weeks most popular hip-hop music) different from the first and second groups/genres.

Figure 29:
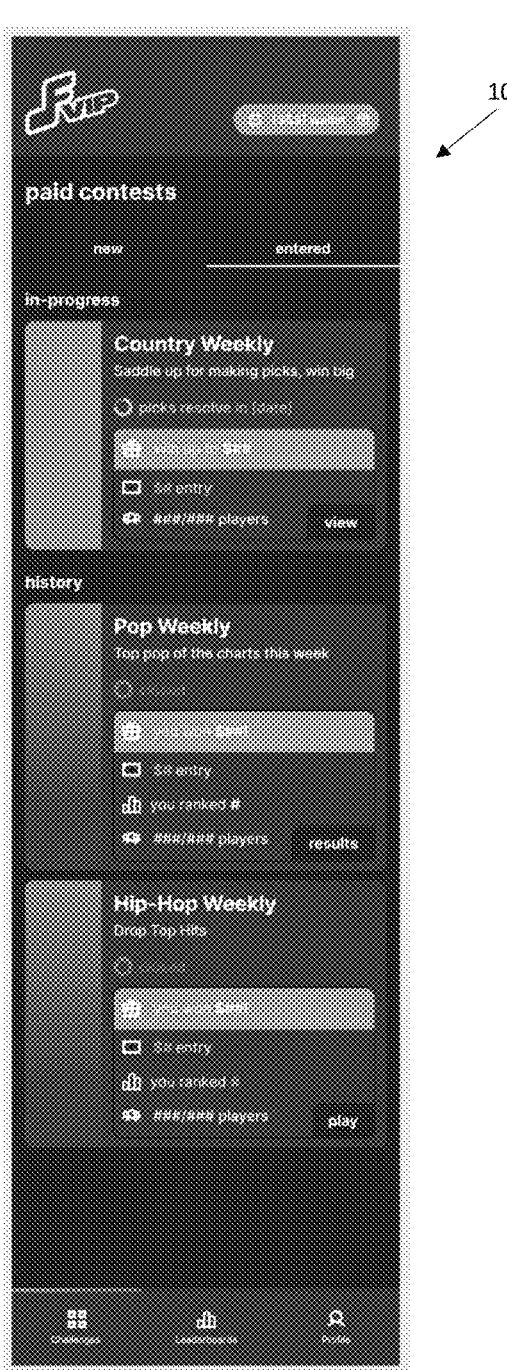
FIG. 29 is a display screen of an embodiment of a GUI of a page displaying an entered contest.
Figures 30, 31:
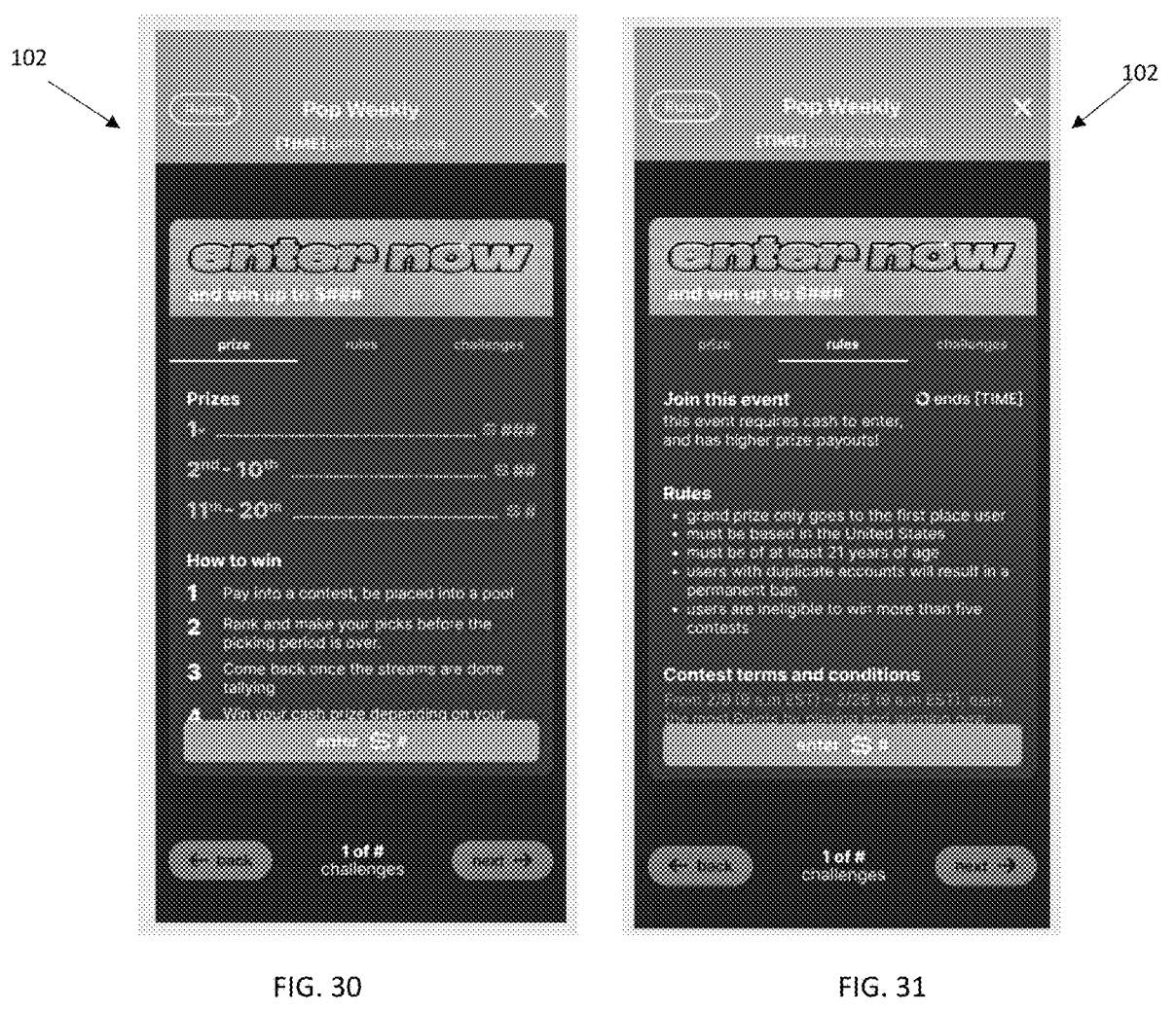
Figures 32, 33:
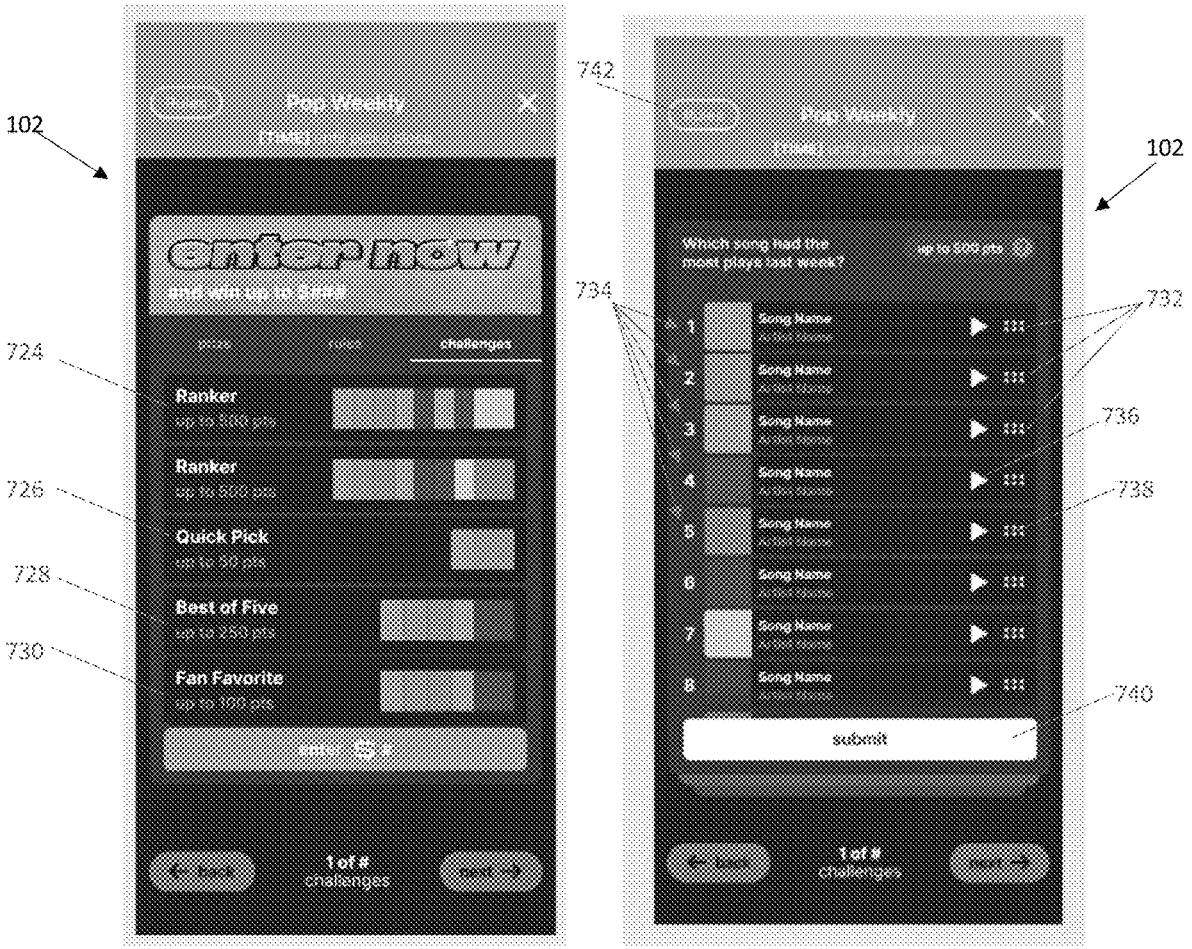

In various embodiments, a user may also be able to access a registry of competitions/contests the user is participating in and/or has historically participated in, as shown in FIG. 29. In one or more embodiments, upon authenticating a user a paid competition/contest registry may be displayed. In a refinement, the competitions 704 may be displayed with competition information, as shown in FIGS. 28-29, such as the requirements for entering such as entry fees/costs, the number of players participating and/or an upper limit for the number of players permitted to participate, and/or any awards for winning the competition. In a variation, a user may select the competition to obtain further competition information related to the competition, as shown in FIGS. 30-32. For example, award details (e.g., "prizes"), instructions, rules, and/or contests of the competition may be available and displayed. In a variation, the user may be prompted to enter the competition upon reviewing the competition information, as shown in FIGS. 30-32. In a refinement, a single prompt may both enter a user into the competition and authorize a payment of real and/or virtual credit/currency.

In one or more embodiments, each competition includes one or more (e.g., a plurality of) contests 724, 726, 728, 730. The contests may be various methods of competing against other users. Each contest may allow one or more contestants to make one or more selections via a corresponding user transceiver. In a refinement, the competition may include one or more ranking and/or non-ranking contests. The selections may be associated with the virtual music label associated with the use or contestant. A selection may represent a song, album, artist, and/or music video. Relational tables may be configured to receive selections of songs, albums, artists, and/or music video from the contestants, and reward points based on the selections. After receiving one or more selections, the points may be awarded to each contestant based on the corresponding selections and/or activity tracking parameters of those selections. The sum of the rewarded points may be calculated to determine/assign a score for each contestant. The schema may also rank the contestants based on the score.

In one or more embodiments, a computer application such as on a mobile computing device may be employed. In a refinement, the schema may employ one or more SQL databases for storing the information and executing the application. The application may access and/or manage the contestants, the plurality of selections, the one or more activity tracking parameters, and/or the scores. For example, the application may display a lobby screen for a competition, as shown in FIG. 20, where the one or more competitions and/or contests 608 (e.g., plurality of contests) are displayed. The lobby screen may also display a countdown timer 610 depicting the time remaining in the competition. A leaderboard screen, as shown in FIG. 21, may also be available in the application. The leaderboard screen may display the ranking of contestants based on their scores. In a refinement, the displayed ranking may be provided in real time. In a refinement, each user may begin the competition with zero points at the start of the competition (i.e., start date/time) and thereafter the score may accumulate based on the points awarded from each contest.

Referring to FIG. 1 again, the mobile device 100 may be configured to transmit and receive data through the internet 150. The internet 150 may be reached through cellular towers, satellite or ad-hoc networks. The mobile device 100 may be connected with a backend server 120. The backend server 120 may serve as the main repository for data and information associated with the game. The backend server 120 may include a data store and processing components to store digital content items and references, calculate scores associated with digital user rankings, track activity parameters to determine the score, and otherwise facilitate the game. The backend server 120 and mobile device 100 may be connected with a third-party fingerprinting server 130.

The third-party fingerprinting server 130 may determine the unique identifiers associated with original digital content items and derivative digital content items. It should be appreciated that any combination of servers 120, 130 and mobile devices 100 may facilitate the game. For example, the game may be operated entirely on one device 100.

Figure 2:
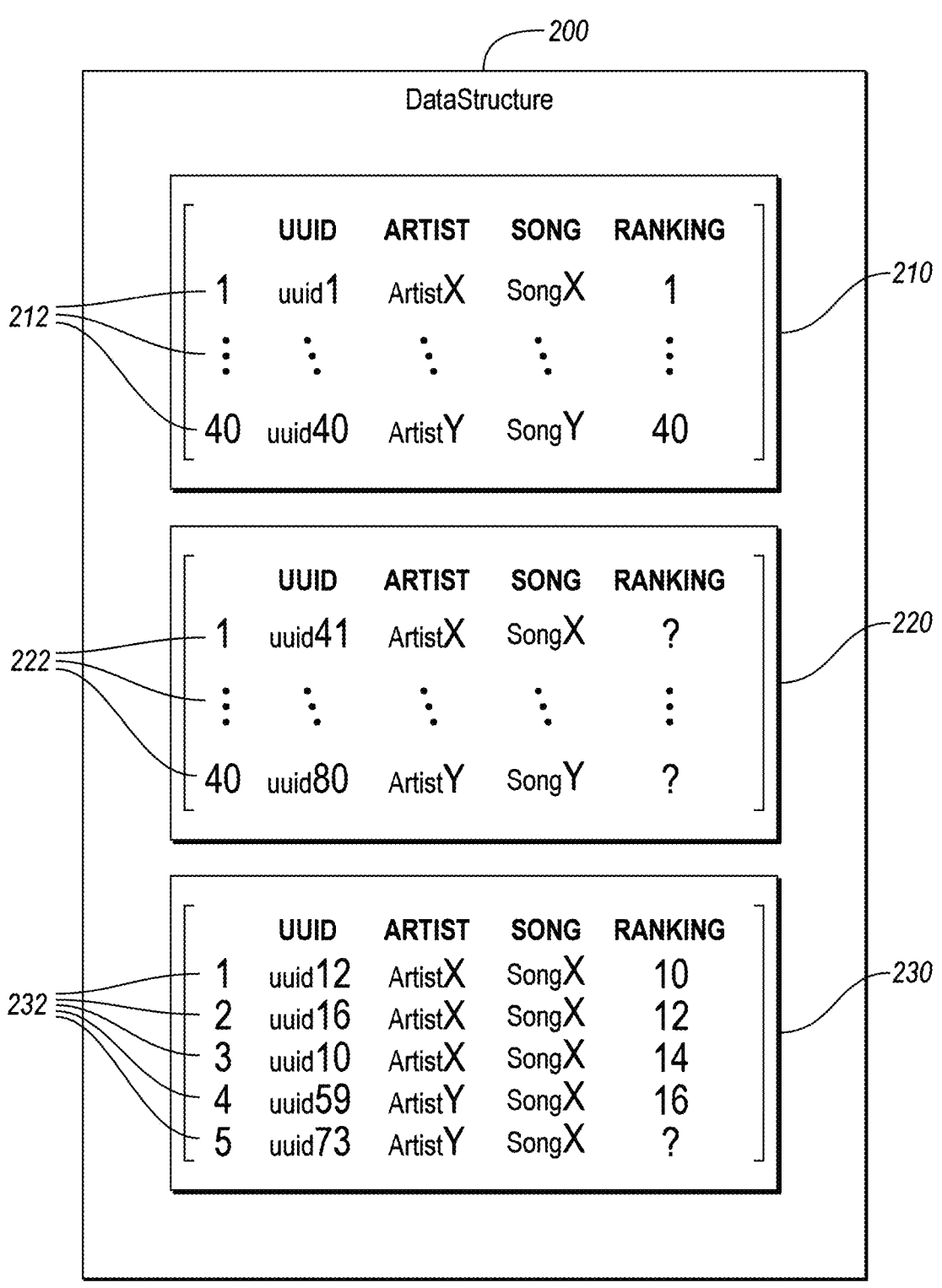
FIG. 2 is a data schema for storing a first or second digital register and a digital user ranking.

Referring to FIG. 2, a portion of a data structure 200 is shown. The data structure includes an efficient storage mechanism for storing digital user rankings 230 and digital registers 210, 220 of digital content items 212, 222, 232. The digital content items 212, 222 may be assigned to rows each having a unique identifier and other digital content item 212, 222 information. The ranked digital register 210 may include a variety of ranked digital content items 212 taken from a digital content repository. The repository may be located on the third-party fingerprinting service server 130. The digital content repository may be located on the data store of the backend server 120. The ranked digital register 210 may look like schema 1, below.

$$\begin{bmatrix} & UUID & ARTIST & SONG & RANKING \\ 1 & uuid1 & ArtistX & SongX & 1 \\ \vdots & \ddots & \ddots & \ddots & \vdots \\ 40 & uuid40 & ArtistY & SongY & 40 \end{bmatrix} \quad (1)$$

In order to sort the ranked digital register 210, the items may be bucket sorted, bubble sorted, insertion sorted, selection sorted, heap sorted, or most preferably merge sorted. The digital content items 212 may be arranged for selection by the user of the mobile device 100. The digital content items 212 may be arranged in the digital register 210 in a variety of ways. The digital content items 212 may be ranked according to popularity. The popularity index may be localized to the region or association of the user of the mobile device 100. For example, the ranked digital register 210 may be formed based on the local popularity of the digital content item 212. The digital content item 212 may be a song, book, movie, streamed media, music video, or other created content available in a digital form. The ranking may also take into consideration hardcopy or paper forms of the digital content items. The popularity index may incorporate or consist of a public popularity index (e.g., Nielsen®).

The data structure 200 may include an unranked digital register 220. The unranked digital register 220 may include unranked digital content items 222. The unranked digital content items may be selected from a variety of sources. The unranked digital content item 222 may be associated with the user of the mobile device 100. The unranked digital content item 222 may be promoted by a local radio station or part of an association related to the user of the mobile device 100. The unranked digital register 220 may be similar to schema 2, as shown below. As shown, the unranked digital content items 220 have different unique identifiers (UUIDs) than the ranked digital content items. The digital content items 212, 222 of the ranked and unranked digital registers 210, 220 may have little or no intersection.

$$\begin{bmatrix} & UUID & ARTIST & SONG & RANKING \\ 1 & uuid41 & ArtistX & SongX & ? \\ \vdots & \ddots & \ddots & \ddots & \vdots \\ 40 & uuid80 & ArtistY & SongY & ? \end{bmatrix} \quad (2)$$

The data structure 200 may include a digital user ranking 230 including selected digital content items 232. The selected digital content items 232 may be selected from at least one of the ranked and unranked digital registers 210, 220. The selected digital content items 232 may be tracked to determine the top score of the players in the game. The digital user ranking 230 or a portion thereof may be sent to the backend server 120. For example, the UUIDs associated with the selected digital content items 232 may be sent to the backend server. In another embodiment, activity tracking data associated with selected digital content items 232 may be sent to the mobile device 100 for tabulation thereby reducing the processing and memory required to obtain a score. The digital user ranking may be similar to schema 3, as shown below. Portions of the data structure 200 may be located on the backend server 120, mobile device 100, or third-party server 130.

$$
\begin{bmatrix}
& UUID & ARTIST & SONG & RANKING \\
1 & uuid12 & ArtistX & SongX & 10 \\
2 & uuid16 & ArtistX & SongY & 12 \\
3 & uuid10 & ArtistX & SongZ & 14 \\
4 & uuid59 & ArtistY & SongX & 16 \\
5 & uuid73 & ArtistY & SongY & ?
\end{bmatrix} \tag{3}
$$

The data structure 200 may further include an activity tracking schema to track activity associated with each digital content item UUID. The activity tracking schema may include competition starting date ranking and accumulators for each of the activity tracking genres and each of the digital user rankings 230. For example, the activity tracking schema may include a column for tracking the promotions a user has made for each selected digital content item 232 on the digital user ranking 230.

The data structure 200 may further include demographic tracking information related to the user, contest, association, digital content creator, digital content items, or other information of interest. The data structure 200 may track what associations are promoting a digital content item or determine song preferences of a user.

Figure 3:
FIG. 3 is a display screen of an embodiment of a computer graphical user interface (GUI) for a game having a four-day contest.

Referring to FIG. 3, a computer graphical user-interface (GUI) for the game is shown. The splash screen is displayed on the GUI 102 of the mobile device 100. The splash screen may define the game to be played. In various embodiments, a variety of different contests may be provided. For example, ranking contests, contests involving selecting one or more digital content items (e.g., virtual record label, pick'em, best of five, quick pick). In a refinement, the selections may be picked from a registry or pool. Additionally, or alternatively, a user may introduce new digital content items. In one or more embodiments, a score associated with the selections may be based on past, present, and/or future information such as a stream count from the previous week, a real-time stream count, or a stream count at a future contest expiration date/time.

For example, the game to be played may be a four-day contest organized by a radio station. In one or more embodiments, a contest may include a selection of four ranked digital content items 212 from the ranked digital content register 210 and one unranked digital content item 222 from the unranked digital content register 220. The contest may be any length of time or be based on other factors (e.g., point total accumulation). The contest may vary by location and contest.

Figure 35:
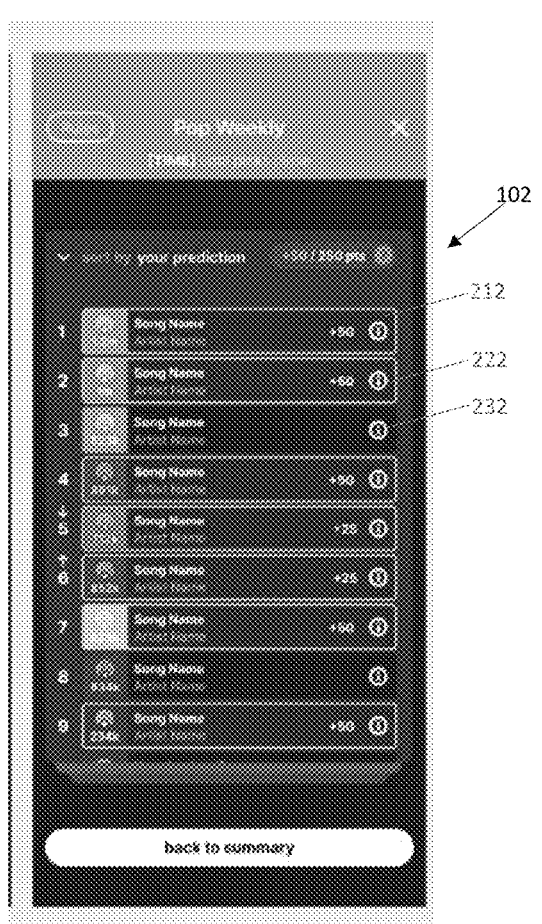

In a variation, a ranking contest, as shown in FIG. 35 may be provided. A ranking contest may involve ranking a plurality of digital content items 212, 222, 232 such as songs, artists, and/or albums to predict one or more activity tracking parameters such as future popularity, success, index ranking, stream count, or other activity tracking parameters of the digital content items. In a refinement, a user may have to rank all the digital content items presented. For example, a ranking contest may instruct users to rank at least three (3) songs, at least five (5) songs, or at least ten (10) songs to predict a past, present, or future rank according to an activity tracking parameter (e.g., which digital content item will have the greatest number of streams, the least number of streams, and/or those in between). A user may be scored by an activity tracking algorithm based on the accuracy of the user ranking and the activity tracking parameter(s). For example, a user may receive a higher score for a more accurate ranking and a lower score for a less accurate ranking. In a variation, each paid competition may include at least one ranking contest. In a refinement, each paid competition may include a plurality of contests. In various embodiments, the plurality of contests may include contests that are different in kind.

Figure 4:
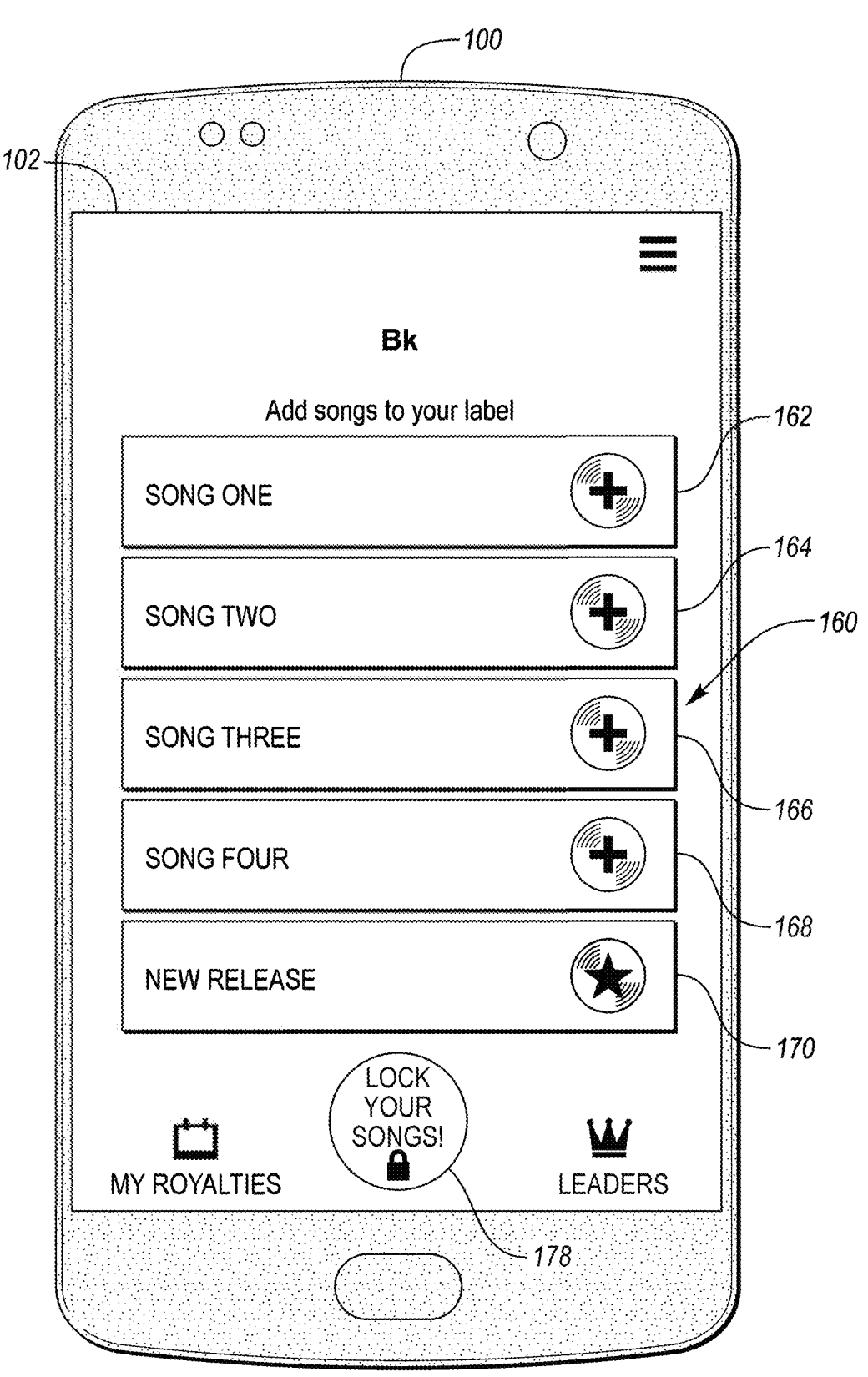
FIG. 4 is a display screen of embodiment of a GUI including a selection screen for a digital user ranking of a digital register.
Figure 5:
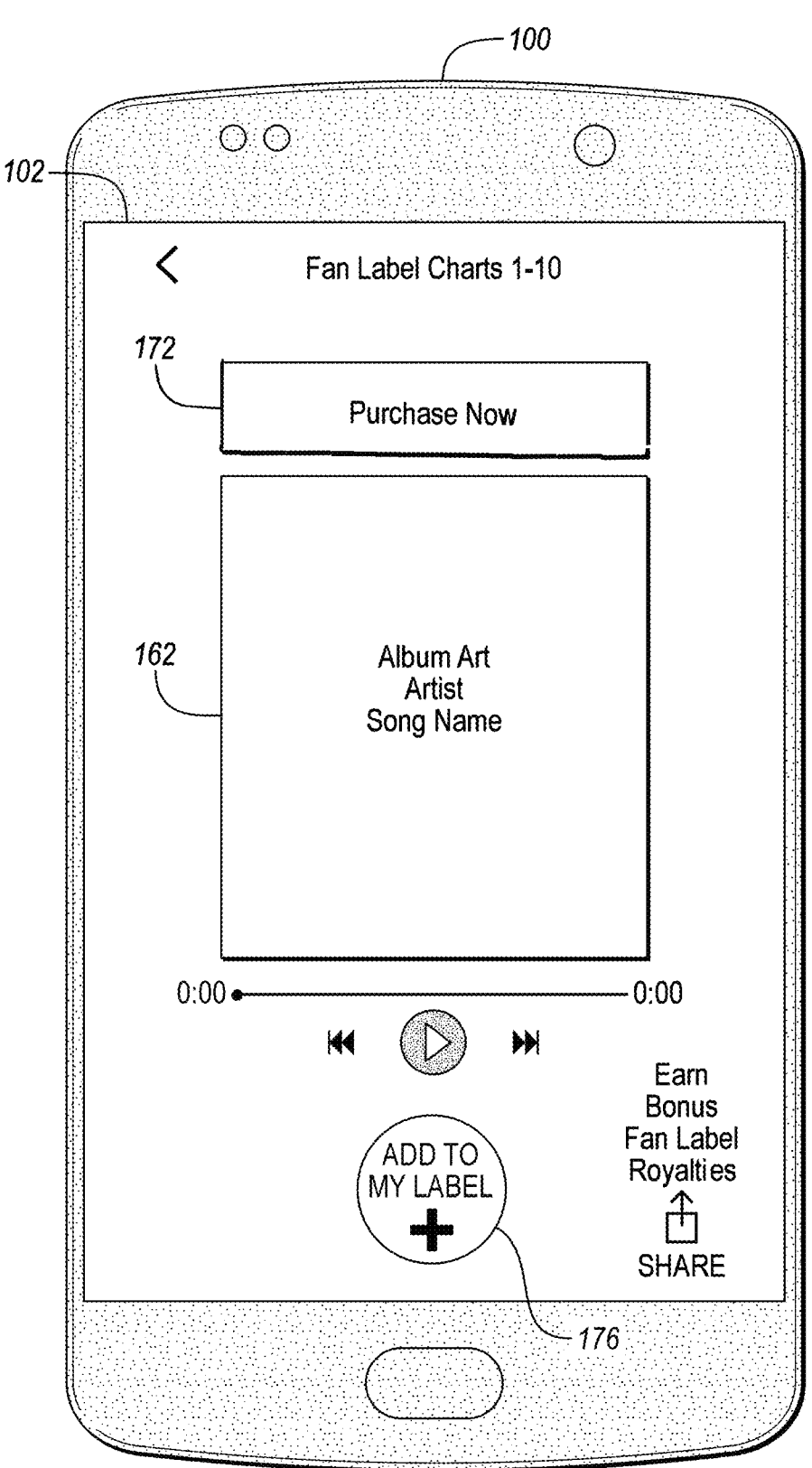
FIG. 5 is a display screen of embodiment of a GUI including a selection screen of a digital content item from a digital register.
Figure 6:
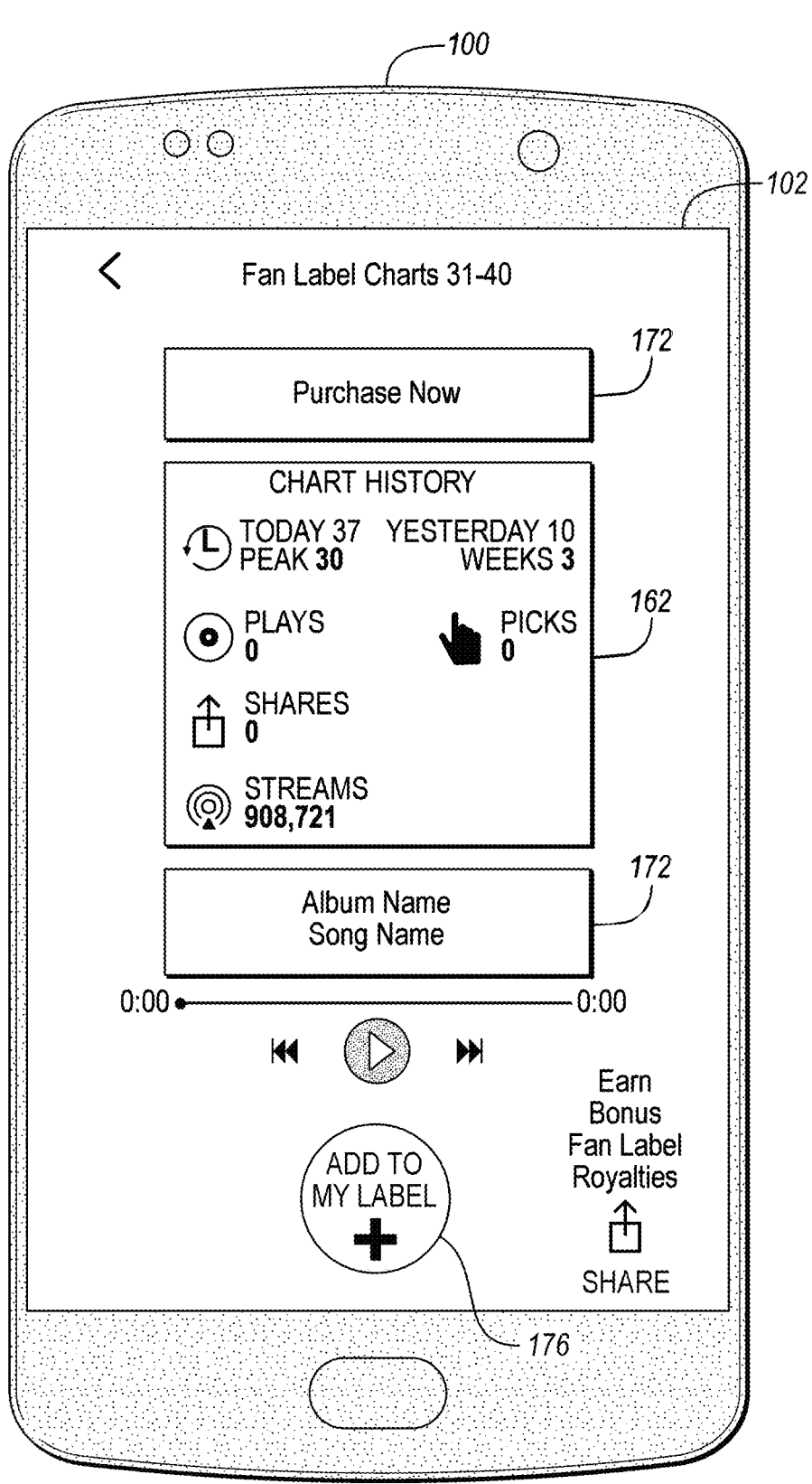
FIG. 6 is a display screen of embodiment of a GUI including a selection screen of a digital content item from a digital register.
Figure 7:
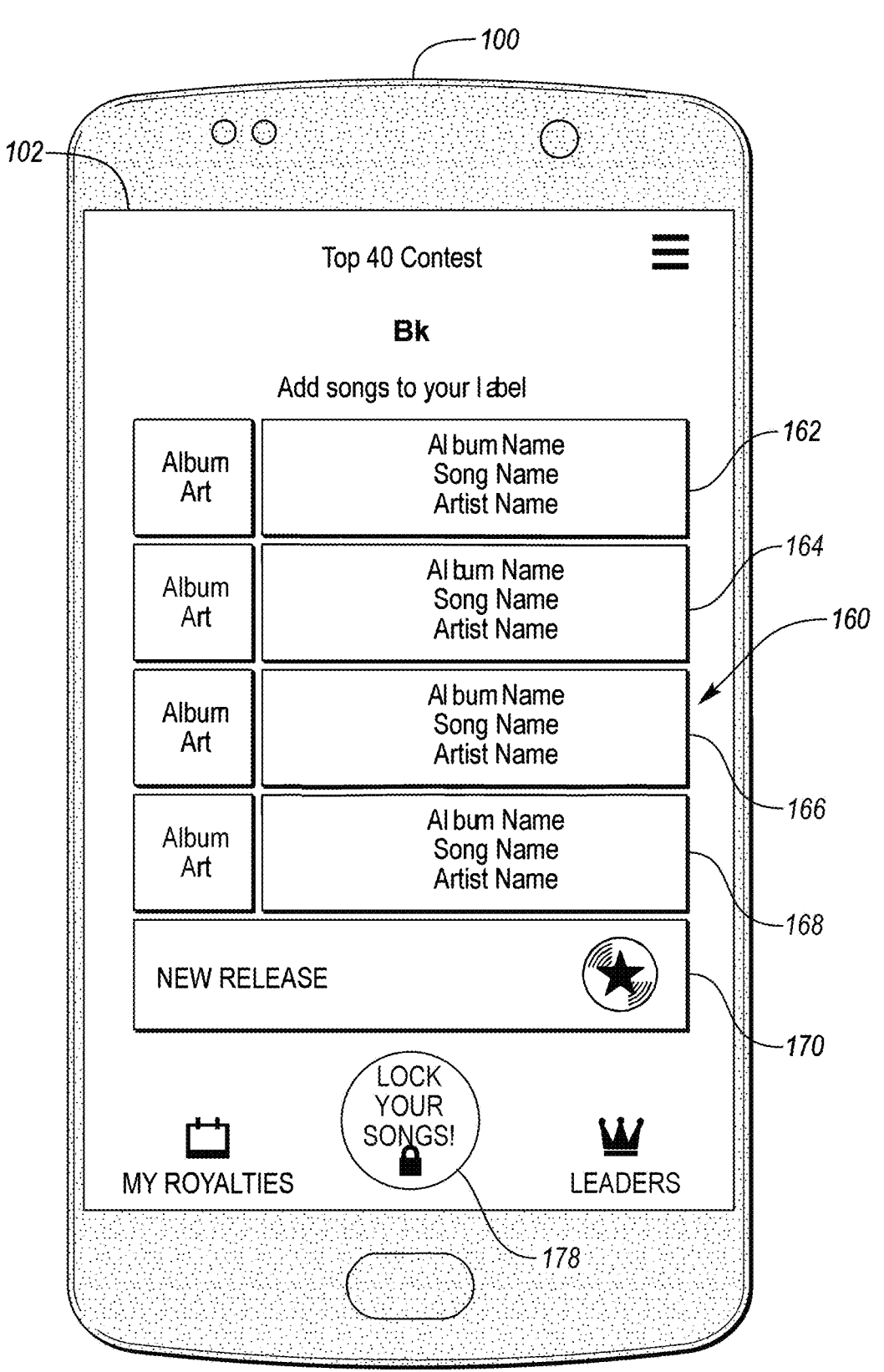
FIG. 7 is a display screen of embodiment of a GUI of a digital user ranking for a game.
Figure 8:
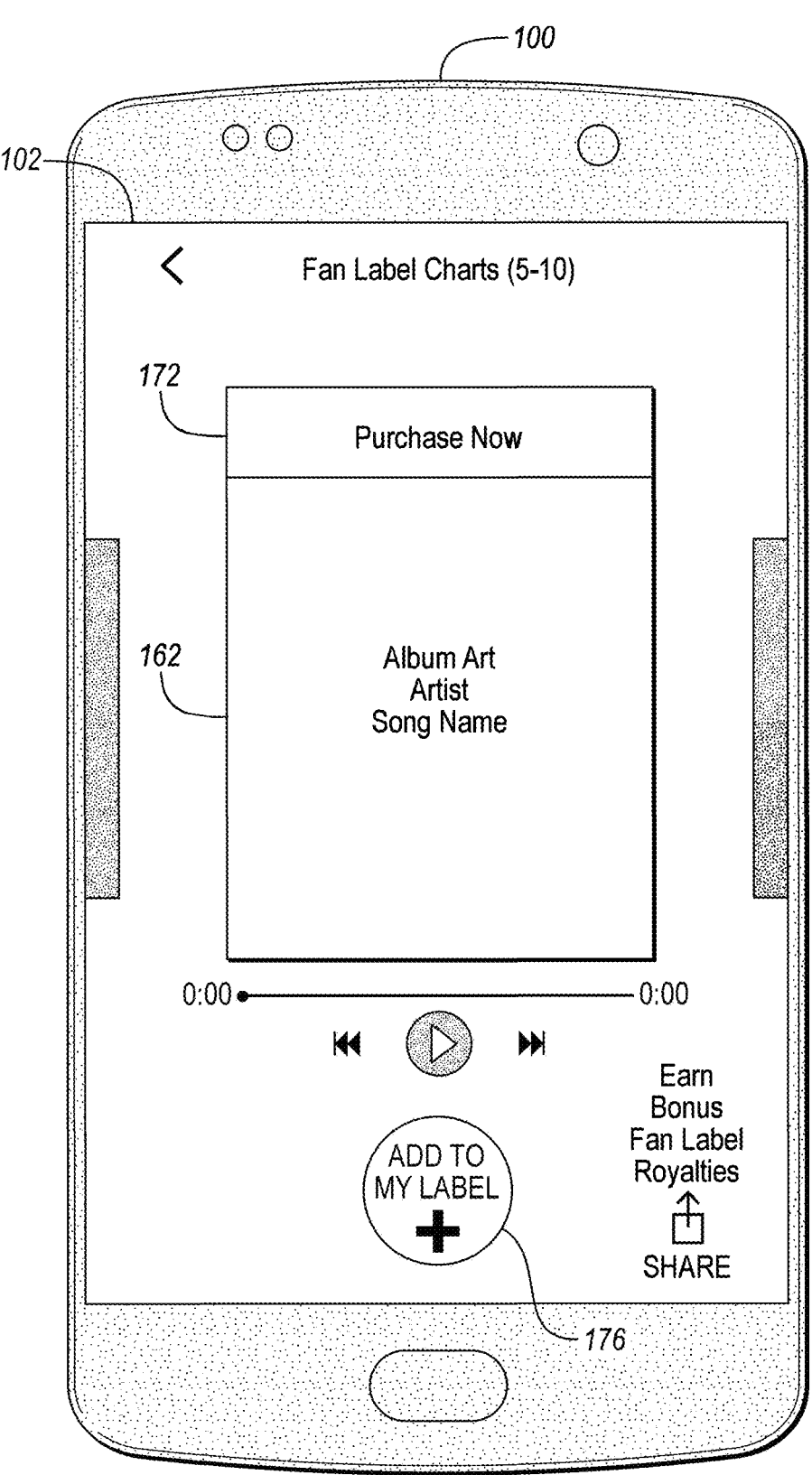
FIG. 8 is a display screen of embodiment of a GUI display of an uncharted digital content item of an uncharted digital register.

Referring to FIG. 4, a mobile device 100 having a GUI 102 is shown. The GUI includes a digital content item selection screen 160 of a software application. The digital content selection screen 160 includes a number of selection prompts 162, 164, 166, 168, 170 operable to enable a user to select from a ranked digital content register 210 and an unranked digital content register 220. The score may be viewed by the "my royalties" button. The overall game score may be viewed with the "leaders" button. The user may select the digital content items 212, 222 and proceed to "lock" 178 a selection before the game is started.

Figure 9:
FIG. 9 is a display screen of embodiment of a GUI including a selection lock screen and game timer countdown screen.

Referring to FIGS. 5-8, GUIs of the ranked digital register 210 and unranked digital register 220 are shown. The mobile device 100 includes a GUI 102. The GUI 102 includes scrollable prompts 162, 164, 166, 168, 170 for selecting a ranked digital content item 212 and an unranked digital content item 222. Additional information related to the digital content item 212 is selectively shown through button 162. The user is also prompted to purchase a digital content item with button 172. Button 176 allows the user to add the ranked digital content items 212, 222 to the selection. After the digital content items 212, 220 are selected, the user may use button 178 to select in the digital content items 212, 222, which adds the items 212, 222 to the digital user ranking 230. Referring to FIG. 9, a splash screen is shown on the GUI 102 of the mobile device 100. The splash screen indicates the time remaining in the contest 180 and a confirmation button 182.

Figure 10:
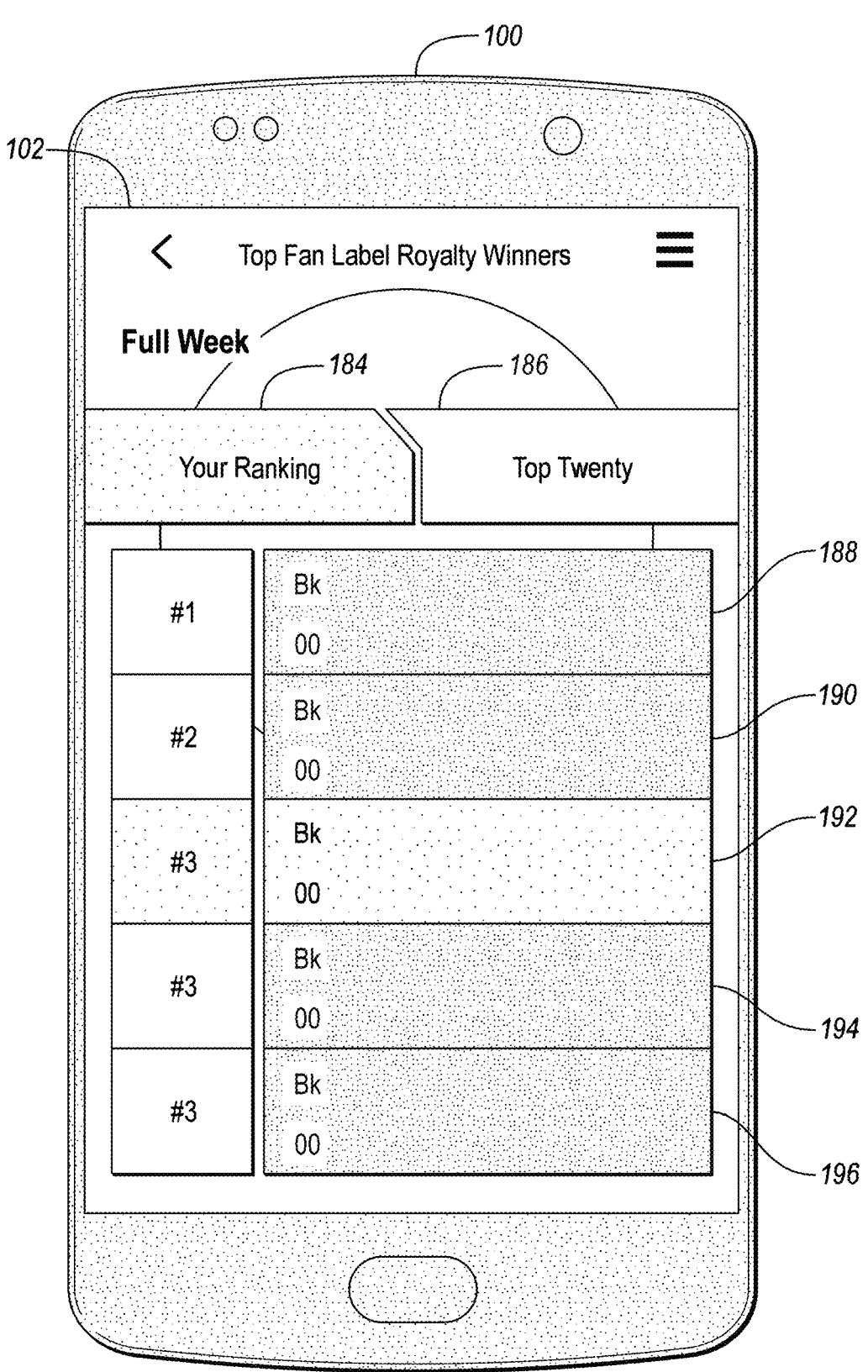
FIG. 10 is a display screen of embodiment of a GUI including a scoreboard of a digital user ranking.

Referring to FIG. 10 a list of points 188, 190, 192, 194, 196 associated with digital user rankings 230 is shown on the GUI 102 of the mobile device 100. The contest may have numerous digital user rankings 230 from various participants, as shown through each of the point accumulators 188, 190, 192, 194, 196 related to each of the digital user rankings 230. The list is sorted such that the digital user ranking 230 having the highest number of accumulated points 188, 190, 192, 194, 196 is shown. The points are accumulated through activity tracking. The user may select to display a personal ranking 184 or the top twenty digital user rankings 230 through button 186. In some embodiments, the scores 188, 190, 192, 194, 196 may be shown as ticker tape across a top or bottom portion of the GUI 102.

Figure 11:
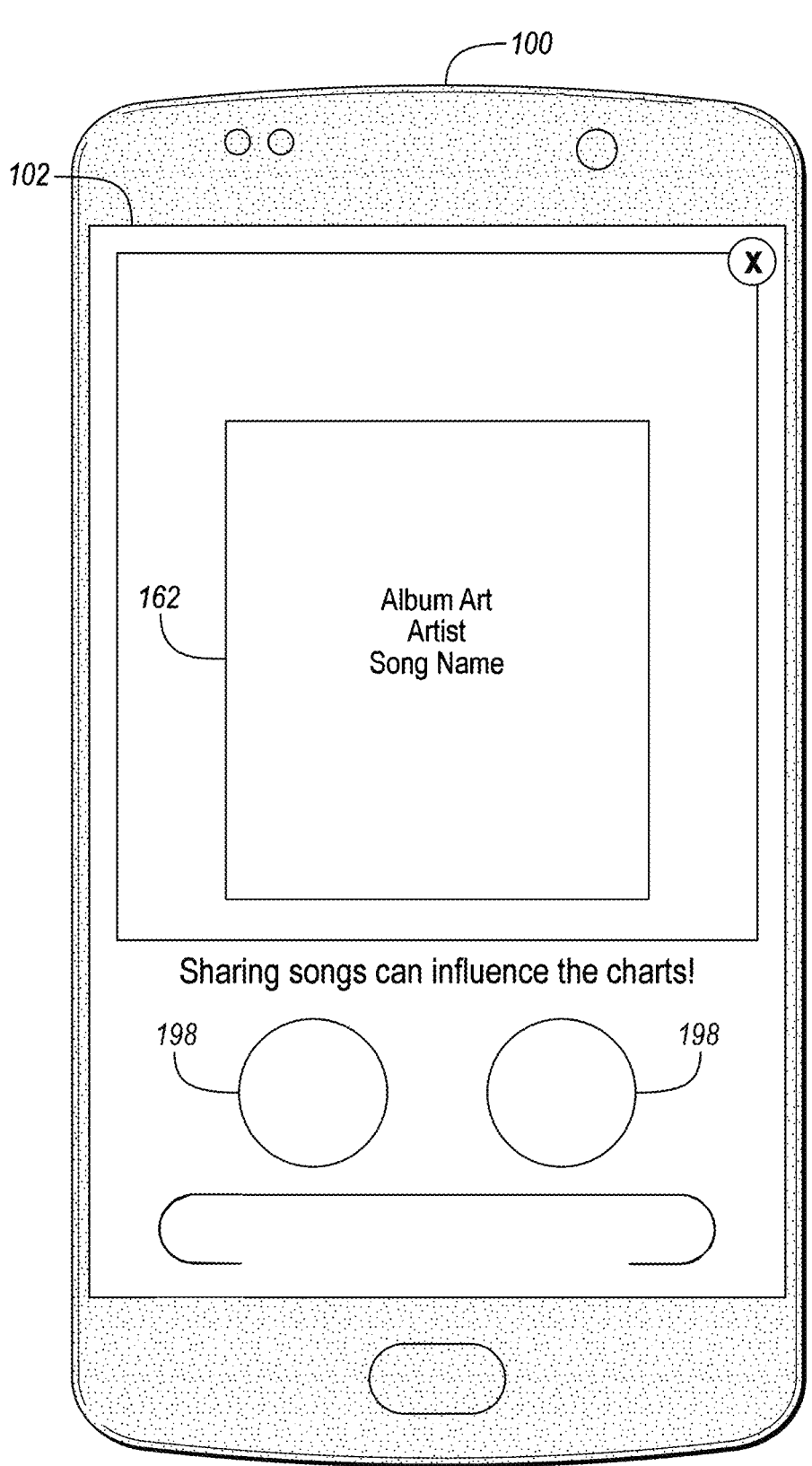
FIG. 11 is a display screen of embodiment of a GUI including a promotion screen of a digital content item associated with a digital user ranking.

Referring to FIG. 11, the user may promote or share a selected digital content item 232 associated with the digital user ranking 230 through a similar interface on the GUI 102 of the mobile device 100. A prompt 162 including information associated with the selected digital content item 232. The user is then prompted to promote the selected digital content item 232 through buttons 198 connecting the content to a network. Promotion may be considered an activity tracking parameter that increases a score 188, 190, 192, 194, 196 associated with the user's digital user ranking 230. In a refinement, activity (e.g., streams, purchases, etc.) derived from sharing may contribute more to a contestant's score compared with unassociated activity.

Figure 12:
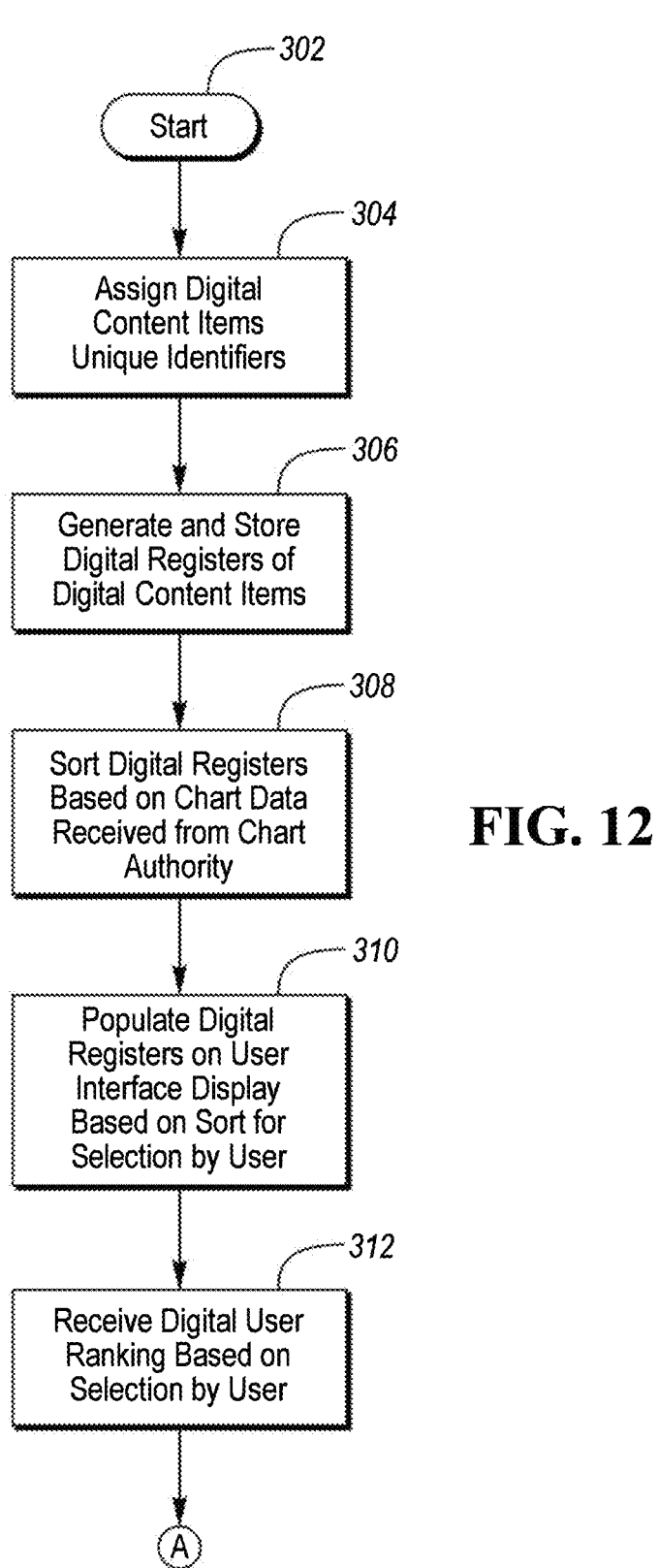
FIG. 12 is a portion of a flow diagram for an improved game scoring computer system.
Figure 13:
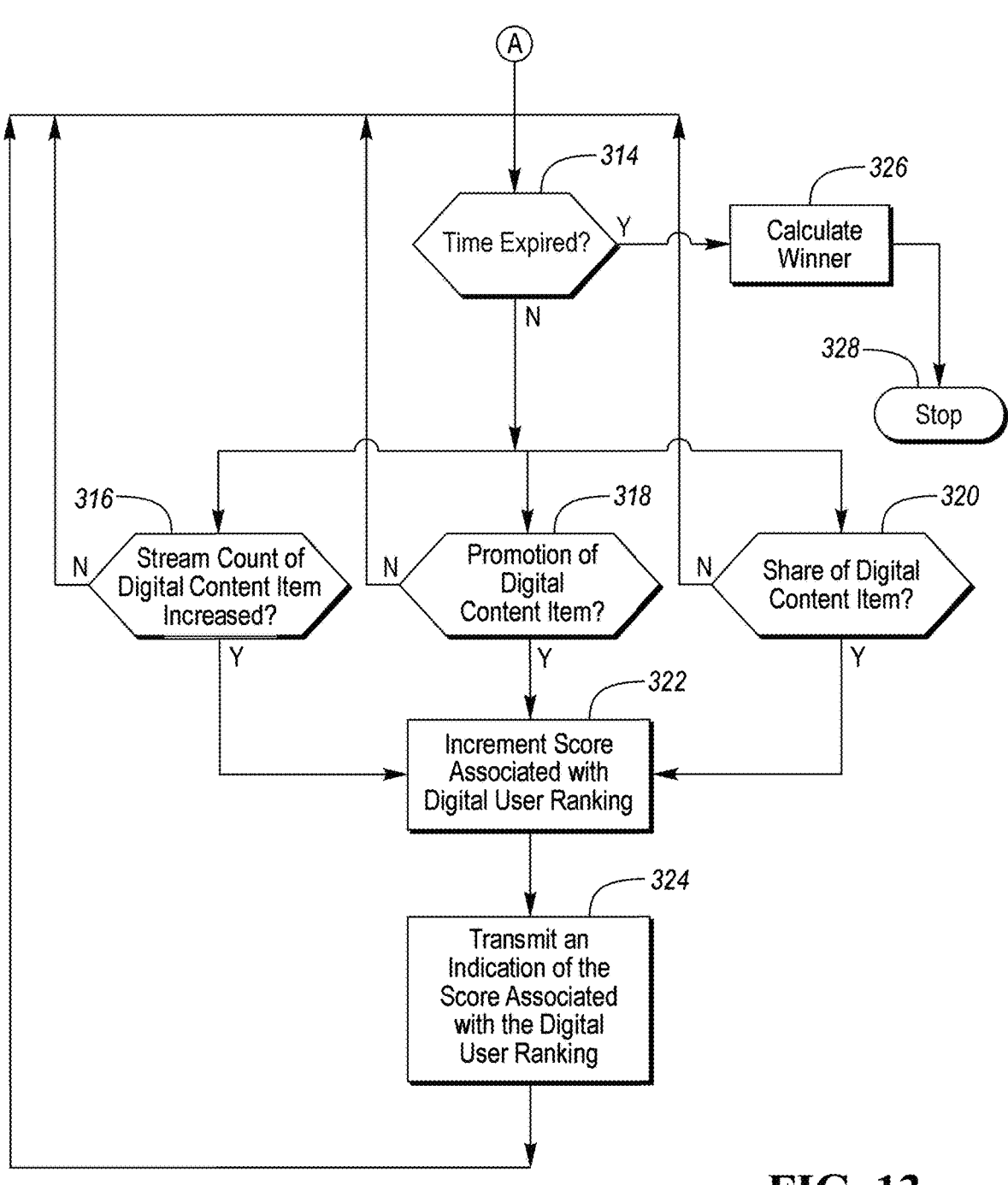
FIG. 13 is a portion of a flow diagram for an improved game scoring computer system.

Referring to FIGS. 12 and 13, a flow diagram 300 of a game is shown. In step 302 the algorithm begins. In step 304, the digital content items 212, 222 are assigned unique identifiers. The unit identifiers may be assigned through a hashing algorithm (e.g., MD5) to uniquely identify each digital content item 212, 222 for selection. The unique identifier may include a portion to signify an original or derivative work.

In step 306, the ranked and unranked digital registers 210, 220 are generated and stored. The ranked digital register 210 is generated based on popularity or other factors. Nielsen® charts and chart positions may be used. The chart position or ranking may indicate a statistical approval rating of the digital content item 232. The chart position or ranking may be defined at a national, state, or local level. Local popularity indexes based on streams in particular regions or associations may be used. For example, the streams belonging to a particular university may be aggregated and assigned to a ranking. The unranked digital register 220 may be generated based on the user or other factors. For instance, the unranked digital register 220 may be created by a local radio station or a college club.

In step 308 the digital registers are sorted and stored by the ranking. The sorting may be performed using various methods. For instance, a merge sort may be used to streamline the sorting process at the mobile device 100. In step 310, the digital registers 210, 220 are populated on the mobile device GUI 102. In step 312, the user selects the digital user ranking 230 by identifying ranked and unranked digital content items 212, 222.

In step 314, the mobile device 100 or backend server 120 determines whether the contest timer has expired. If the timer has not expired an activity tracking algorithm is initiated to determine total points assigned to each selected digital content item 232 selected in the digital user ranking 230. For example, a score associated with the selected digital content item 232 of the digital user ranking is incremented (step 322) if the stream count of the selected digital content item 232 has increased, in step 316. Periodic polling of streaming services may be performed to determine the number of streams of the selected digital content item 232. In step 318, if the user has promoted the digital content item 318, the score associated with the digital user ranking is increased in step 322. In step 320, if the user has shared the digital content item, the score associated with the digital user ranking is increased in step 322. For example, the user may use a peer-based sharing service to share the selected digital content item 232 with friends on social media. In step 324, an indication of the score associated with the digital user ranking is transmitted or displayed on the mobile device 100.

The score associated with the digital user ranking may also include a risk factor (e.g., odds on a wager). The risk factor may proportionately or disproportionately change the points assigned to each score based on a likelihood of success of the digital content item 212, 222 selection. The risk associated with each digital content item 212, 222 may be displayed next to the item 212, 222 during the selection process. The risk may be based on a trend of the digital content items 212, 222 popularity. For example, a song that is losing popularity may be associated with a higher risk, providing greater reward to the user who includes the song in their digital user ranking 230 if the songs improve or increases in popularity.

In one or more embodiments, the data structure may employ a tiered reward schema based on the risk factor for accessing and managing a tiered incentive program. The tiered schema may coordinate with the contest schema to issue/award rewards. The tiered schema may include a plurality of tiered rewards such that the rewards issued to a user may depend on their status (i.e., which tier the user is affiliated with). In a refinement, rewards awarded (e.g., points) to first tier users (and their respective virtual music label) and/or contestants may be greater than rewards awarded (e.g., points) to second tier users and/or contestants.

For example, a user (or group of users) may be rendered a first-tier status for one or more activities such as introducing or adding a new digital content item (e.g., song, album, artist, and/or music video) to the platform and selecting it in a contest. Another user (or group of users) may be rendered a second-tier status for one or more different activities such as selecting the newly introduced digital content item in a contest based on a recency parameter such as a stream count or time frame, e.g., within its first 500 streams such as on the platform. In a refinement, the recency parameter may be time such as within a week of the new digital content item being added to the platform, or two weeks, or a month. Said differently, a user that recognizes and promotes songs earlier or closer to their initiation on the platform may receive enhanced or greater rewards (e.g., users that recognize or promote songs later get less attribution in the form of virtual credits/currency. This encourages users to discover and promote new media such as a new song or band. In another example, a third user (or third group of users) may be rendered a third-tier status based on the recency parameter or one or more other activities, e.g., by selecting the newly introduced digital content item within the first 500-2500 streams on the platform.

According to a tiered reward schema a promoting user/contestant that adds or introduces a new digital content item (e.g., song/music video/album/artist) may receive the greatest reward such as the most credits. The rewards associated with the various groups may become less as they become more remote from the newly introduced digital content item such as from selecting the newly introduced digital content item, adding the newly introduced digital content item to their label, or further promoting the newly introduced digital content item. For example, each user with second-tier status (e.g., a first group) may receive a greater reward than each user with a third-tier status (e.g., a second group). Similarly, each user with a third-tier status (e.g., the second group) may receive a greater reward than each user with a fourth-tier status (e.g., a third group) and so on. Thus, the rewards are based on one or more activity tracking parameters as well as a risk factor or tier status. For example, the number of points (i.e., credits) reward may correspond to one or more activity tracking parameters such as a stream count and the rewards may be enhanced such as by a multiplier associated with the risk factor or tier-status or vice versa (e.g., the reward may be based on a tier-status and enhanced by the activity tracking parameter). In various embodiments, the promoting user's reward may be multiplied by 100, whereas the reward for each user of the first group may be multiplied by 10, the reward for each user of a second group may be multiplied by 5, and the reward for each user of a third group may be multiplied by 2.

In various embodiments, the promoting user may upload a new digital content item to the platform and be presented with one or more digital promotion tools such as for creating a shareable link that directs the user to the application and/or the digital content item(s). For example, the link may be shared on website or social media platform or distributed to contacts in a contact list such as from a user's mobile phone or email account. The parties receiving the link may likewise share or promote the link by sharing it in the same or a different manner. The activity such as the activity tracking parameters (e.g., a stream count) associated with the promoting activity (e.g., shared link) may be tracked by the activity tracking algorithm. The act of sharing itself my also be an activity tracking parameter. In a refinement, the shareable link may play a sample of the digital content item(s), direct a user to purchase the digital content item(s), and/or add the digital content item(s) to playlist such as those hosted by digital service providers (DSPs) like Apple Music® and/or Spotify®.

For example, the link may be a deep link that directs the user to the application where the user who activated the link may listen to a sample of the digital content item, select it for the same or another competition, promote it by sharing it on the platform or externally, purchase it, or otherwise interact with the digital content item. In a refinement, creating and/or sharing a link may by itself be an activity tracking parameter. For example, the promoting user may receive 1,000 points (i.e., credits) for creating and sharing a shareable link representing a new digital content item and the first 100 users that share or re-share the shareable link may receive 500 points (i.e., credits) while the first 101-500 users that share or re-share the shareable link may receive 100 points (i.e., credits). These points may be enhanced by the success of other activity tracking parameters such as a stream count. For instance, the promoting user may receive 10 additional points for each stream and 100 additional points for each share, while the first 100 user may receive an additional point for each stream and 10 additional points for each share and so on. This encourages user to discover and promote digital content items, e.g., music and generates traffic to the application which creates a music focused experience targeting the discovery and development of music with a like-minded community.

If the contest time has expired, in step 314, the backend server 120 or mobile device 100 will calculate a total score of each of the digital user rankings in the contest. The highest score is then submitted as the winner. In step 328 the game is stopped.

Figure 15:
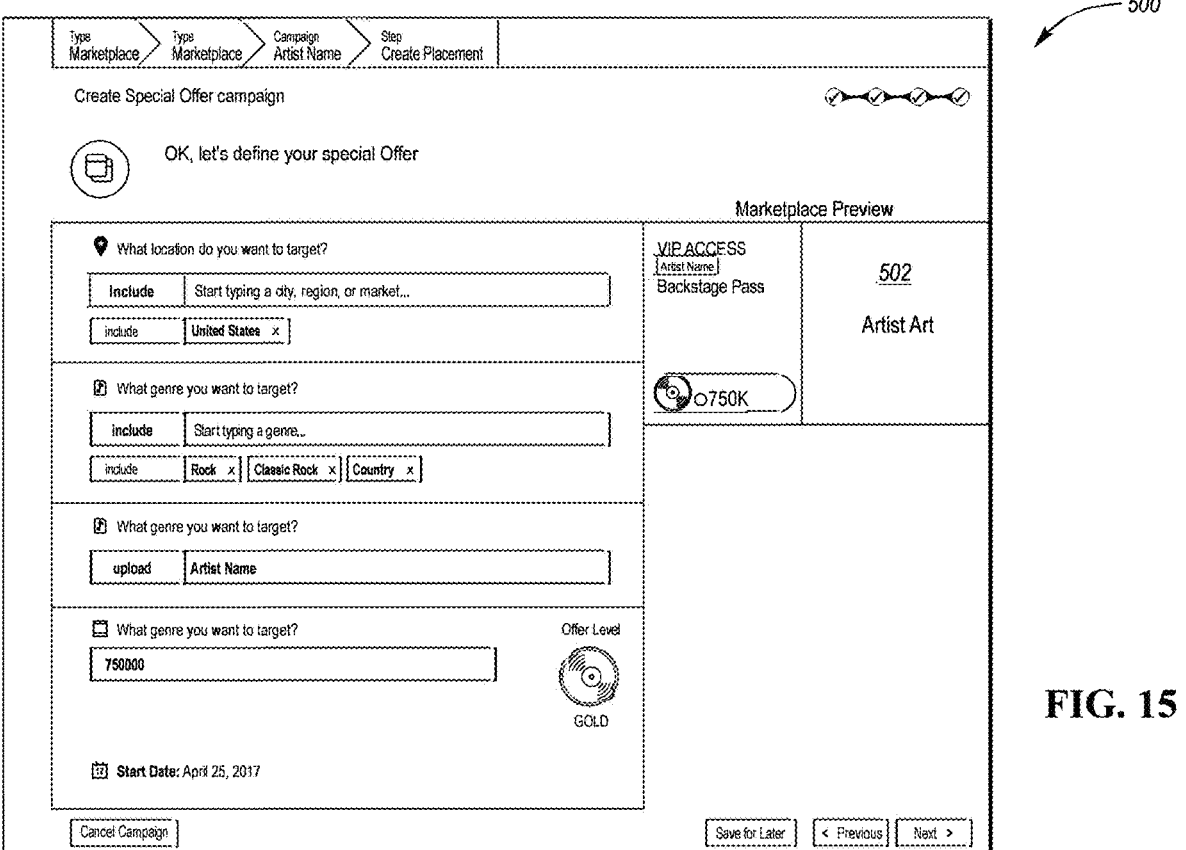
FIG. 15 is a display screen of a GUI including a digital content item creator dashboard.

Referring to FIGS. 14 and 15, GUIs 400, 500 for a marketplace of an incentivized electronic platform is shown. The marketplace includes a dashboard that highlights a digital content creator's activity tracking parameters and other information over time. The dashboard may include information related to particular contests, including rewards, promotions, purchases, impressions, views, shares, contests, and other information. The dashboard may include information related to each of a digital content creator's songs. The dashboard may allow a digital content creator to target particular locations, associations, musical genres, or other contest relevant parameters. The digital content creator may award offerings (e.g., backstage passes, digital content items) to any participant that reaches activity tracking parameter points associated with the particular digital content creator above a predetermined threshold. In a refinement, each user and/or their virtual music label/record may be identified by an ID. For instance, a music artist may give a backstage pass to any contestant/label that reaches a score of 750,000 activity tracking points related specifically to that music artist. The contestant/label may select that artist's songs, promote those songs, share those songs on social media or use other methods to obtain points related to that artist.

The points rewarded in a contest may also accumulate outside of that individual contest in an overall competition. For example, a user and/or music label profile may be rewarded 50 points in a first contest by making a first selection of a digital content item (e.g., a song, album, artist, and/or music video) from a first digital registry and a 150 (additional) points in a second contest by making a second selection of a digital content item (e.g., a song, album, artist, and/or music video) from a second digital registry for a total points (i.e., a cumulative score) of 200 points which may be used for upgrades and/or award offerings for the user and/or music label profile. In a refinement, the first and second registries may be different such that the first and second selections are for different digital content items. In another example, the user may enter a tournament and be ranked second place in the tournament based on being rewarded 1,200 points throughout the tournament. The 1,200 points may also be added to the cumulative score for a total points of 1,400 such that the user's music label profile is also ranked based on his/her overall score amongst all the users. In a refinement, an indication of the cumulative score, cumulative score(s), and/or the ranking may be displayed, for example, via the application on the user transceiver.

In a variation, the data structure may receive a plurality of digital record labels. Each label may correspond to a user and/or their corresponding user transceiver. In a contest and/or tournament, the label may include a plurality of digital content items (e.g., albums, songs, and/or artist) selected from one or more digital registries. In a refinement, the user may select the digital content items via the user transceiver. The label may then be assigned points after initiating an activity tracking algorithm based on one or more activity tracking parameters and the tiered reward schema. For example, a first user may receive a first number of points based on the one or more activity tracking parameters associated with a newly introduced digital content item; a first group of users that selects or adds the newly added digital content item may receive a second number of points based on the same activity tracking parameters; and a second group of users that add or select the newly added digital content item may receive a third number of points based on the same activity tracking parameters. The first, second, and third number of points being different from each other. In a refinement, the first number of points may be greater than the second number of points, and the second number of points may be different than the third number of points.

In one or more embodiments, contestants may enter one or more paid competitions/contests. In a variation, a competition and/or contest may be a game of skill. In a refinement, a game of skill is merit-based such that it is not determined by chance or is primarily/predominantly skill-based. In a variation, the winner and/or leaders are determined by a merit-based score rather than by chance or randomly. In a refinement, the competition and/or contest may be predominantly a game of skill. For example, participants in the competition and/or contest, not randomly selecting, may perform at least 5%, 10%, 15%, 20%, 25%, 35%, 45%, 50%, 75%, 85%, or even 100% better than random chance.

In a refinement, the participants may include randomly selected individuals meeting certain qualifications such as literate individual of at least 18 years old, contestants who have registered with the platform, contestants that use the platform, willing and/or interested individuals, contestants who consider themselves causal music listeners, and/or contestants that consider themselves avid music listeners.

In one or more embodiments, the simulation may be used to access whether a competition and/or contest is predominantly a game of skill or chance. In various embodiments, the simulation may participate like one or more (e.g., a plurality) contestants such as described herein. For example, the simulation may make one or more selections of digital content items in certain competitions and/or contest one or more times (e.g., 5, 10, 100, 1000, 10000 or more times). In a refinement, the simulation may represent random chance. Alternatively, the simulation may be programmed according to one or more algorithms such that it performs better than random chance. Results of a plurality of participants (e.g., 5, 10, 100, 1000, 10000 or more) may be compared with the results of the simulation, other participants, and/or averages of the simulation and/or participants to assess whether the competition and/or contest is predominantly a game of skill or a game of chance. In some embodiments, the contestants may compete against the simulation (or Bot) and/or be awarded for outperforming and/or performing as well as the simulation.

In one or more embodiments, the algorithm (or any algorithm described herein) may be a machine learning algorithm used to simulate contestants and/or predict selections/music/listening trends or patterns based on data such as activity tracking parameters from the platform data (e.g., contestant selections, behaviors, use, streams, etc.) or third party data such as stream count, popularity indexes, or from the digital content items themselves (e.g., artist, album, names, and/or images associated therewith), and/or the music (e.g., song), publicly available information, and/or other associated data.

In one or more embodiments, the machine learning algorithm is implemented using artificial intelligence. The machine learning algorithm may be an algorithm that improves its accuracy through experience. The machine learning algorithm may enable one or more embodiments to learn and improve from the previous experience, and/or the data described herein without explicit programming. The machine learning algorithm may be a neural network algorithm. The neural network, random forests, support vector, k-nearest neighbors, symbolic regression algorithm may be trained to recognize complex patterns within the data and learn to represent non-linear relationships between the data and predict trends. The machine learning algorithm may be implemented as machine instructions on non-transitory memory stored on a computer where the machine instructions are to be executed by the computer.

In various embodiments a paid competition may include a plurality of contest. For example, one or more ranking contest, pick'em contest, best of group contest, quick pick contest, and/or virtual record label contest. In some competitions, contestants may be able to navigate between contests of the competition such as by swiping left or right. In various embodiments, a competition may include at least one or a plurality of ranking contests (e.g., one, two, three, four, or more ranking contests).

Figure 36:
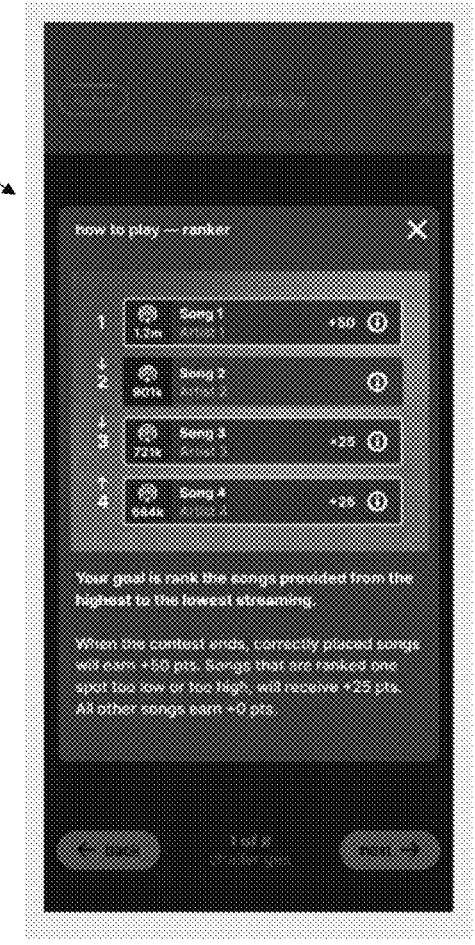
FIG. 36 is a pop-up display screen of an embodiment of a GUI showing the rules for the ranking contest of FIGS. 33-35.

In one or more embodiment, a ranking contest may refer to a contest where a plurality of digital content items (e.g., at least three, four, five, six, seven, eight, nine, ten digital content items) are displayed to a user to be ranked. In a refinement, the user may be presented with three, four, five, six, seven, eight, nine, ten, or more digital content items to be ranked based on an activity tracking parameter as discussed above (e.g., stream count on the platform or on a local, regional, or national popularity index such as Nielson® or Apple Music® charts). In a variation, the user may be prompted to rank each of the digital content items presented and be awarded points based on the accuracy of the ranking. In one or more embodiments, a contestant may be awarded a first number of points for ranking in a correct position and second number of points that is less than the first number of points for ranking close to or within a predetermined number of positions of the correct position, as shown in FIG. 36. For example, a contestant may be prompted to rank ten digital content items and be awarded 50 points for each digital content item that is correctly ranked. In a variation, a contestant may also be awarded 25 points if the digital content item is incorrectly ranked but in an adjacent position (i.e., a position that is one position too high or too low). For example, a contestant ranked a digital content item as fifth, but the correct ranking was fourth (or sixth). In yet another embodiment, the third number of points, which is less than the first and second number of points, may be awarded for being within two positions of the correct position. In various embodiments, contests that do not involve ranking, at least three digital content items, or each presented digital content item may be consider non-ranking contest. For example, various other non-ranking contests are described herein.

Figure 34:
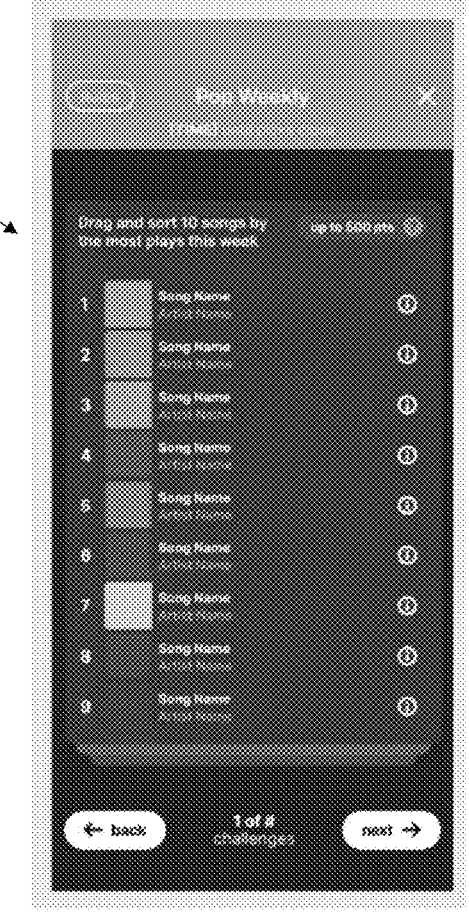

In various embodiments, each contestant may be presented with the plurality of digital content items in a random order or ordered according to something other than the relevant activity tracking parameter (e.g., alphabetically, release date, etc.). For example, the digital content items may be presented as a plurality of stacked blocks 732 in a plurality of positions 734 (e.g., 1-8), as shown in FIG. 33. In a variation, each block 732 may include information related to the digital content item such as a song name, artist, album, and/or representative image. In a refinement, each block 732 may also include a play button 736 that may be selected to play (at least a portion) of the digital content item, which may assist a user in ranking the digital content items. In one or more embodiments, each block 732 may include a button 738, which may provide a user with additional options and/or information related to the digital content item. In various embodiments, a contestant may select each digital content item's position in the rank such as by dragging and dropping each block to the desired position. In a variation, once a contestant ranks the digital content items as desired the ranking may be submitted such as by pressing a submit button 740. In numerous embodiments, the ranking may be locked, as shown in FIG. 34, upon pressing "submit."

After completion of the competition/contest contestants may be able to review the contest and scoring information, as shown in FIG. 35. For example, plays (e.g., stream count) of each digital content item may be displayed and/or the points awarded for the contestants ranking (e.g., "+50" and/or "+25"). In a refinement, a contestant may also select a digital content item, button, or icon thereon for additional information related to the results.

In some embodiments, the described contest and information GUI may be presented on a single window/screen (e.g., a live or moving window/screen) or plurality of windows/screens unless otherwise indicated. Instructions, potential awards, contest duration, rules, and/or the contest name may be made available on the contest window/screen or otherwise made available such as through a button or navigating one or more menus. For example, a rules button

742 may be selected for additional information about the rules such as in a pop-up display, as shown in FIGS. 36, 40, and/or 44.

Figure 37:
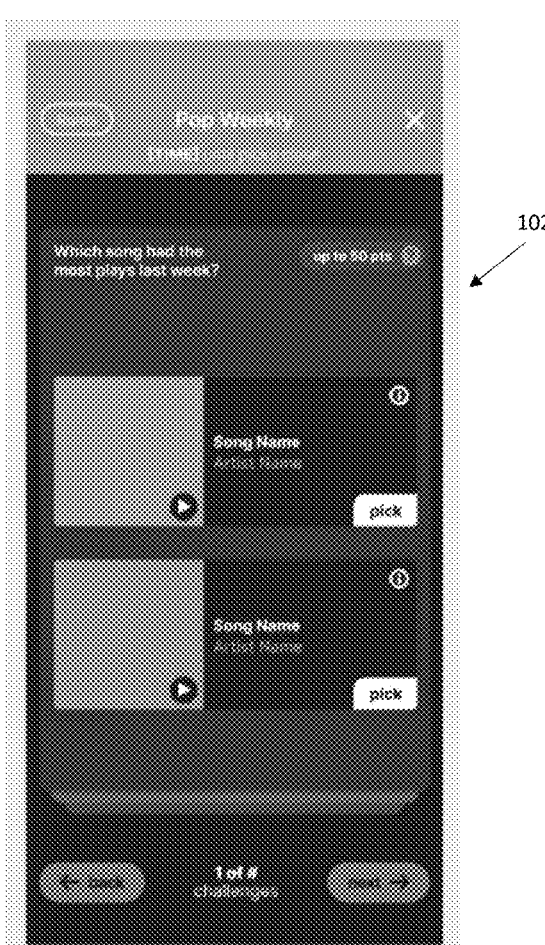
FIGS. 37-39 are display screens of an embodiment of a GUI for a quick pick contest.
Figure 38:
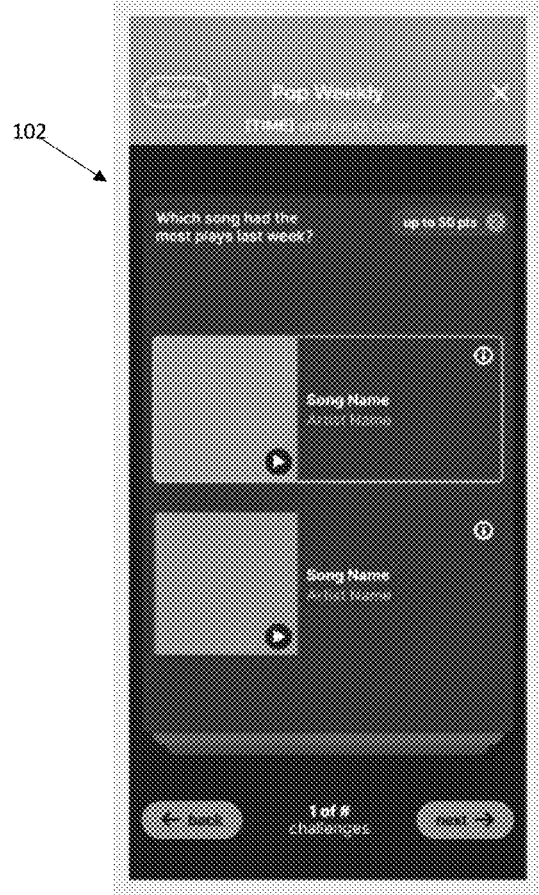
Figure 39:
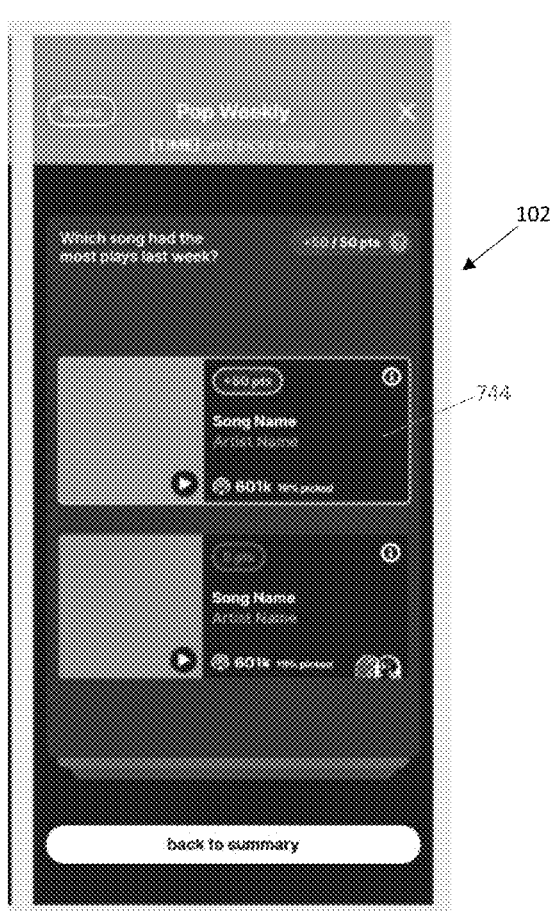

In various embodiments, one or more (e.g., a plurality) of quick pick contests may be include and presented to a contestant. In one or more embodiments, a quick pick contest may prompt a user to pick one digital content item among a plurality (e.g., two, three, four, five, six, seven, eight, nine, ten, or more) of digital content items to predict an activity tracking parameter (e.g., past or future stream count). For example, a contestant may be prompted to select one or more (e.g., a plurality of) digital content items "[w]hich . . . had the most plays last week?" as shown in FIG. 37. As described above, the digital content items may be displayed or represented as blocks 744 with information such as the song name, artist, and/or album as well as buttons to play (at least a portion) of the digital content item and/or for additional information. In a refinement, a quick pick contest may be between only two digital content items. Upon selecting a digital content item, the contestants pick may be locked as shown in FIG. 38 and scored as shown in FIG. 39. In various embodiments, the blocks 744 may also provide additional information such as the number of participants that selected each digital content item.

Figure 42:
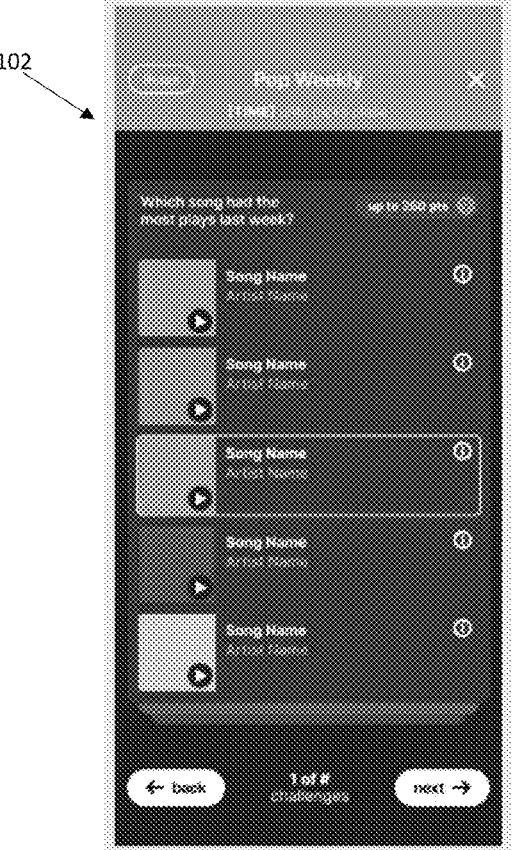
Figure 43:
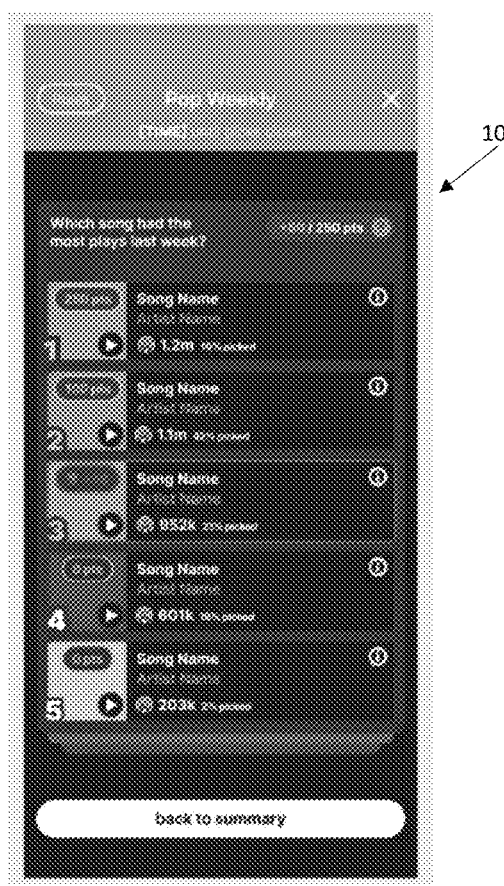
Figure 44:
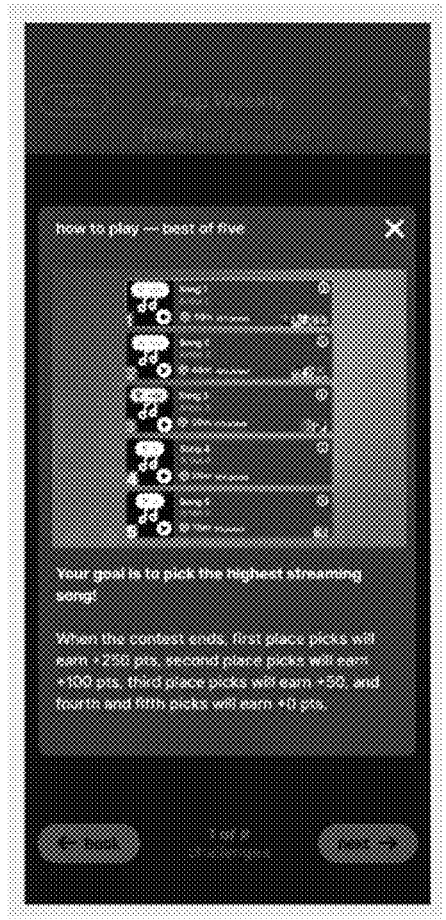
FIG. 44 is a pop-up display screen of an embodiment of a GUI showing the rules for the best-of-five contest of FIGS. 37-39.
Figure 45:
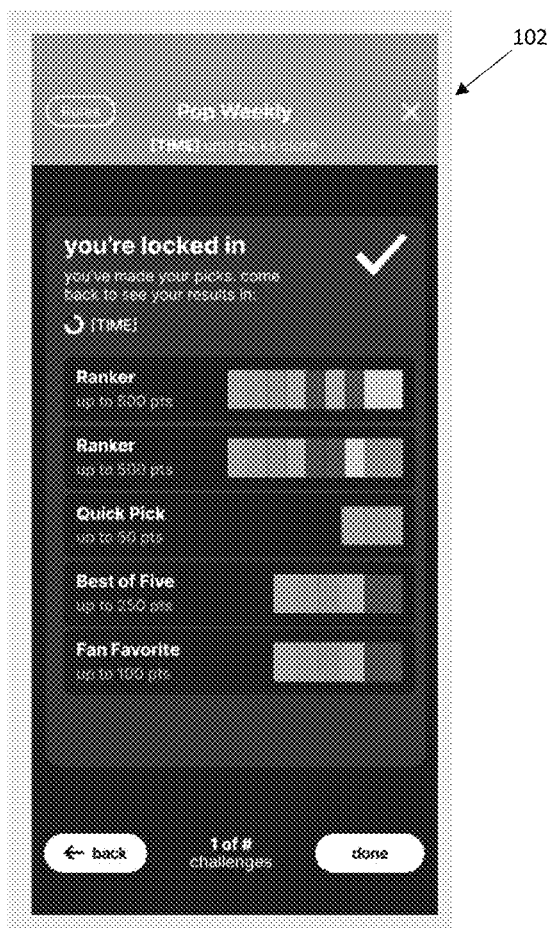
FIG. 45 is display screen showing an embodiment of a GUI showing a completed competition with all contest selections locked.

A group pick contest (e.g., best of three, five, ten, etc.) may involve selecting one or more digital content items among a group of digital content items such as at least three (3), four (4), five (5), ten (10) or more digital content items. For example, a contestant may select a single digital content item among five digital content items based on a predicted activity tracking parameter ("Which song had the most plays last week?"), as shown in FIG. 41. Once the user selects a digital content item the selection may be locked as shown in FIG. 42 and scored as shown in FIG. 43. In a refinement, a contestant may be awarded a first number of points for the correct selection, second number of points for an incorrect selection that is closest, and a third number of points for an incorrect selection that the second closest, and so on. For example, as shown in FIG. 43, a contestant may be awarded 250 points for selecting the correct digital content item, 100 points for selecting the closest incorrect digital content item, and 50 points for selecting the second closest incorrect digital content item. In a refinement, when a group pick contest and quick pick contest are presented together, such as in the same competition, the quick pick contest may have different and less digital content item to select from compared to the group pick.

In various embodiments, a contest may be based on past, present, or future results. In one or more embodiments, a competition including a plurality of contests may include contests based on past results, present results, future results, or a mix thereof (e.g., a quick pick contest based on past results and a ranking contest based on future streams). In one or more embodiments, a combination of contest may be included in a single competition. For example, a ranking contest where a user ranks five digital content items may be combined with a group pick contest of five (different) digital content items where the user picks one to form a game of skill competition.

Figure 47:
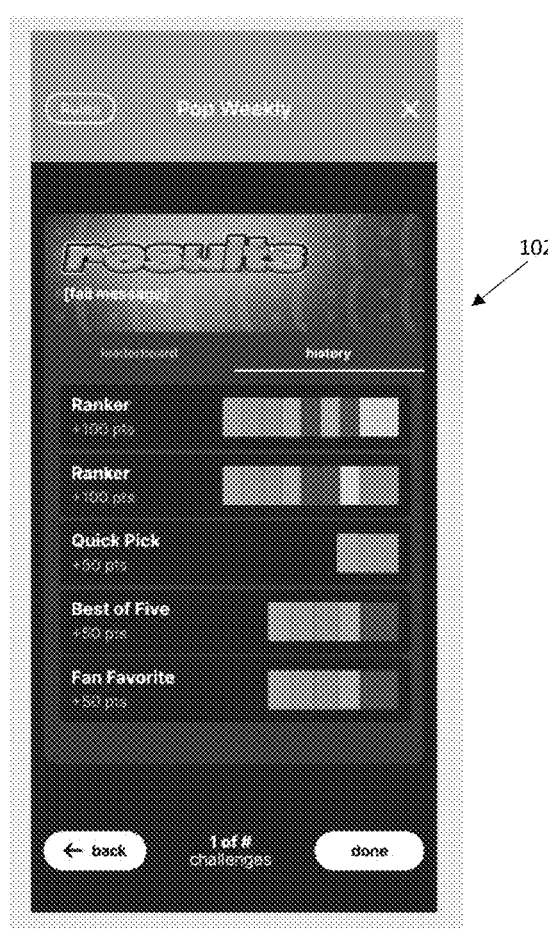
FIG. 47 is a display screen of an embodiment of a GUI showing a user's past results.

Upon expiration of competition, the winner and/or leaders and/or score may be displayed to the contestants. One or more leaders may be awarded virtual credits/currency, which may be exchangeable for monetary compensation such as United States Dollars. In various embodiments, a user may be able to review the competition results. For example, a summary of the results may be displayed showing points awarded from each contest as shown in FIG. 47.

Figure 46:
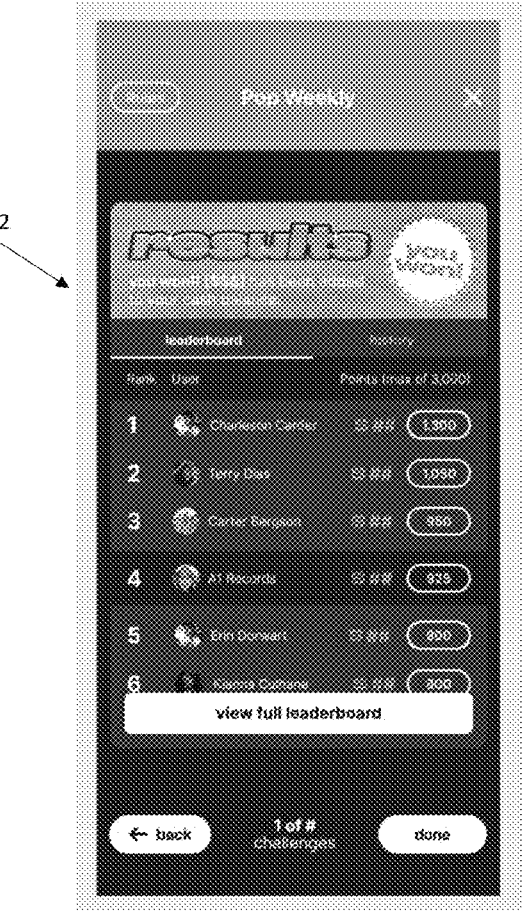
FIG. 46 is a display screen of an embodiment of a GUI of a leaderboard for the competition of FIGS. 30-32.
Figure 48:
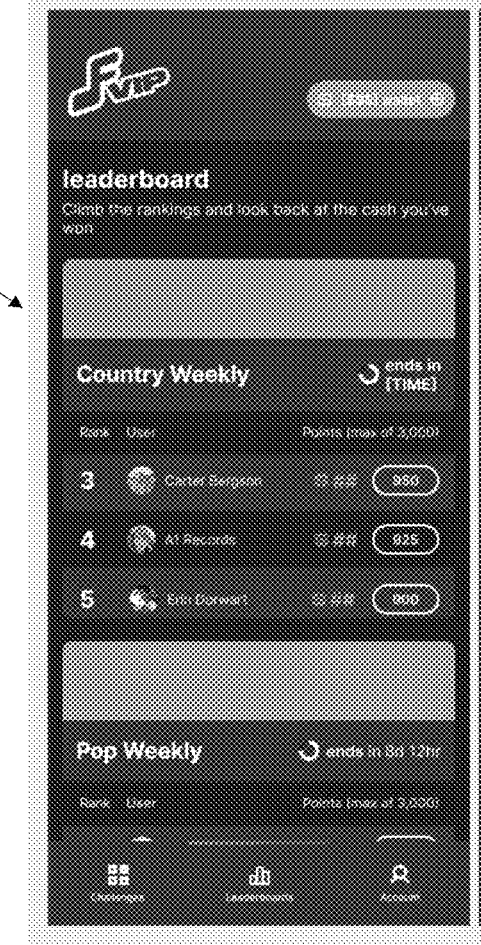
FIG. 48 is a display screen of an embodiment of a GUI for a leaderboard summary for different genres.
Figure 49:
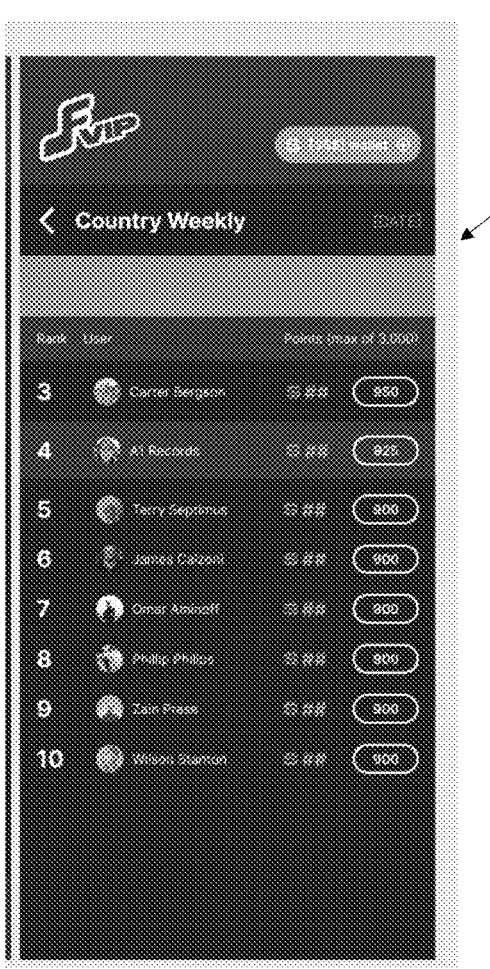
FIG. 49 is a display screen of an embodiment of a GUI for a leaderboard summary for a specific genre.

In one or more embodiments, the total reward of points and/or virtual currency may be displayed to one or more users (e.g., a plurality of users, participating contestants, all users) such as on a leaderboard as shown in FIGS. 46 and 48. In a refinement, subject matter leaderboards may also be displayed or available to participants. In a variation, the subject matters may be different musical genres such as country, rock, pop, hip hop, rap, classic, punk, etc.

In one or more embodiments, one or more contests such as the ranking contest may be weighted such that the one or more contests contribute a greater maximum number of points that may be obtained than any other contest and/or all the remaining (non-ranking) contests. In numerous embodiments, the points accumulated in a paid contest may be added to an overall score for the virtual record label or user profile. Alternatively, the points awarded in a paid competition/contest may only be relevant to that competition/contest and not added to the overall points.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A data structure embodied on a non-transitory computer-readable medium having a database schema to administer a competition with a structured query language (SQL) database, the database schema comprising a registration schema to receive information from contestants including payment information, assign contestant information to each contestant, and create a contestant profile for each contestant;

a contest schema including one or more competitions of skill for entry by the contestants, each competition of skill including one or more contest, each contest including presenting a plurality of pre-existing digital content items for selection by the contestants;

a digital user ranking schema to score a contest selection of each of the contestants, the digital user ranking schema including an activity tracking algorithm and/or relational data tables to track activity tracking parameter(s) associated with each contest selection and to generate a score for each contestant based on the contest selection of the contestant and the activity tracking parameter(s); and an incentivized results schema to award a winning contestant based on a corresponding score of the winning contestant.

2. The data structure of claim 1, wherein the one or more digital content items is representative of a song.

3. An incentivized electronic platform comprising:

a processor including a computer having a central processing unit (CPU) for executing machine instructions and a memory for storing the machine instructions, the machine instructions configured to perform the following functions:

registering a plurality of users, registration including creating a user profile for each user, assigning authenticating information to each user, and receiving payment information and funds distribution information for each user;

authenticating the plurality of users using the authenticating information;

displaying a competition of skill to the plurality of users for selection responsive to authenticating the plurality of user, the competition of skill including a plurality of contests, each contest including a plurality of digital content items for selection by each user;

receiving a selection of the competition of skill from each of the plurality of users;

receiving authorization of a payment responsive to selection of the competition of skill;

displaying the plurality of digital content items responsive to receiving the selection of the competition of skill and receiving authorization of the payment, wherein an outcome of the competition of skill is not determined by chance;

receiving one or more selections of one or more digital content items from each user for one or more of the contests;

generating a score for each user with an activity tracking algorithm based on one or more activity tracking parameters associated with the one or more digital content items selected;

ranking each user among the plurality of users based on the score to determine a leader; and awarding the leader with an award.

4. The incentivized electronic platform of claim 3, wherein the plurality of digital content items includes a song, artists, or album.

5. The incentivized electronic platform of claim 4, wherein each digital content item of the plurality of digital content items is a song.

6. The incentivized electronic platform of claim 4, wherein the plurality of contests includes a ranking contest.

7. The incentivized electronic platform of claim 6, wherein the ranking contest includes ranking at least three digital content items.

8. The incentivized electronic platform of claim 6, wherein the plurality of contests includes a non-ranking contest.

9. The incentivized electronic platform of claim 3, wherein the competition of skill is displayed among a plurality of competitions of skill.

10. The incentivized electronic platform of claim 9, wherein the plurality of competitions of skill are drawn to different subjects.

11. The incentivized electronic platform of claim 10, wherein the different subjects are different musical genres.

12. The incentivized electronic platform of claim 3, wherein the award is representative of a monetary award.

13. The incentivized electronic platform of claim 3, wherein the award is exchangeable for monetary compensation.

14. The method of claim 3, wherein users outperform random chance in the competition of skill by at least 5%.

15. A method of administering an incentivized electronic platform comprising:

registering a plurality of users by obtaining user information and assigning authenticating information to each user;

authenticating a group of users from the plurality of users;

displaying a registry of competitions to the group of users;

receiving a selection of a competition from the registry and payment from each user of the group of users to participate in the competition, the competition including a plurality of contests;

displaying a plurality of digital content items, from at least one of the contest;

receiving a selection of a user ranking of the digital content items from each user in the group of users;

scoring each user ranking based on one or more activity tracking parameters associated with the digital content items using an activity tracking algorithm to determine one or more leaders; and awarding the one or more leaders with an award representative of a monetary amount.

16. The method of claim 15, wherein the plurality of digital content items includes a song, artist, and/or album.

17. The method of claim 16, wherein the one or more activity tracking parameters includes a stream count.

18. The method of claim 16, wherein the one or more activity tracking parameters includes a chart position.

19. The method of claim 16, further comprising distributing monetary compensation to the one or more leaders in exchange for the award representative of a monetary amount.

20. The method of claim 16, wherein the plurality of digital content items includes at least five digital content items.

21. The method of claim 16, wherein the plurality of digital content items is directed to a genre of music.

* * * * *